US009688035B2

(12) United States Patent
Swier et al.

(10) Patent No.: US 9,688,035 B2
(45) Date of Patent: Jun. 27, 2017

(54) OPTICAL ARTICLE AND METHOD OF FORMING

(71) Applicants: Dow Corning Corporation, Midland, MI (US); Dow Corning Toray Co., Ltd., Tokyo (JP)

(72) Inventors: Steven Swier, Midland, MI (US); Masaaki Amako, Chiba (JP)

(73) Assignees: Dow Corning Corporation, Midland, MI (US); Dow Corning Toray Co., Ltd., Tokyo (JP)

( * ) Notice: Subject to any disclaimer, the term of this patent is extended or adjusted under 35 U.S.C. 154(b) by 199 days.

(21) Appl. No.: 14/372,465

(22) PCT Filed: Jan. 16, 2013

(86) PCT No.: PCT/US2013/021707
§ 371 (c)(1),
(2) Date: Jul. 16, 2014

(87) PCT Pub. No.: WO2013/109607
PCT Pub. Date: Jul. 25, 2013

(65) Prior Publication Data

US 2015/0290887 A1 Oct. 15, 2015

Related U.S. Application Data

(60) Provisional application No. 61/586,988, filed on Jan. 16, 2012.

(51) Int. Cl.
*B29C 35/02* (2006.01)
*B29D 11/00* (2006.01)
*B29K 83/00* (2006.01)

(52) U.S. Cl.
CPC .... *B29D 11/0073* (2013.01); *B29D 11/00451* (2013.01); *B29D 11/00807* (2013.01); *B29C 35/02* (2013.01); *B29K 2083/00* (2013.01); *B29K 2995/0026* (2013.01)

(58) Field of Classification Search
CPC .......... B29D 11/0073; B29D 11/00807; B29D 11/00451; B29C 35/02
See application file for complete search history.

(56) References Cited

U.S. PATENT DOCUMENTS

2005/0065294 A1* 3/2005 Cramer .................. H01B 7/295 525/476
2008/0193749 A1 8/2008 Thompson et al.
2009/0043067 A1* 2/2009 Morita .................. C08G 77/20 528/32
2009/0065792 A1 3/2009 Thompson et al.
2010/0239776 A1 9/2010 Yajima et al.
2012/0009382 A1 1/2012 Kishimoto et al.
2013/0168727 A1 7/2013 Horstman et al.
2015/0001567 A1* 1/2015 Amako ................. H01L 33/501 257/98

FOREIGN PATENT DOCUMENTS

| | | | |
|---|---|---|---|
| CN | 1131089 | A | 9/1996 |
| CN | 1374550 | A | 10/2002 |
| CN | 101529277 | A | 9/2009 |
| CN | 101611502 | A | 12/2009 |
| CN | 101765494 | A | 6/2010 |
| JP | 2015513328 | A | 5/2015 |
| WO | WO-2012/040302 | A1 | 3/2012 |
| WO | WO-2012/040305 | A1 | 3/2012 |
| WO | WO-2012/040367 | A1 | 3/2012 |
| WO | WO-2012/040453 | A1 | 3/2012 |
| WO | WO-2012/040457 | A1 | 3/2012 |
| WO | WO-2013/109607 | A1 | 7/2013 |

OTHER PUBLICATIONS

"European Application Serial No. 13703193.6, Office Action mailed Aug. 22, 2014", 1 pg.
"European Application Serial No. 13703193.6, Response filed Feb. 18, 2015 to Office Action mailed Aug. 22, 2014", 13 pgs.
"International Application Serial No. PCT/US2013/021707, International Preliminary Report on Patentability mailed Jul. 31, 2014", 12 pgs.
"Chinese Application Serial No. 201380013063.4, Office Action mailed May 9, 2016", W/ English Translation, 30 pgs.
"Chinese Application Serial No. 201380013063.4, Office Action mailed Oct. 9, 2015", W/ English Translation, 36 pgs.
"Chinese Application Serial No. 201380013063.4, Response filed Feb. 24, 2016 to Office Action mailed Oct. 9, 2015", with English translation of claims, 18 pgs.
"Chinese Application Serial No. 201380013063.4, Response filed Aug. 24, 2016 to Office Action mailed May 9, 2016", with English translation of claims, 20 pgs.
"International Application Serial No. PCT/US2013/021707, International Search Report mailed Jul. 9, 2013", 7 pgs.
"International Application Serial No. PCT/US2013/021707, Invitation to Pay Additional Fees and Partial Search Report mailed Apr. 16, 2013", 8 pgs.
"International Application Serial No. PCT/US2013/021707, Written Opinion mailed Jul. 9, 2013", 10 pgs.

* cited by examiner

*Primary Examiner* — Margaret Moore
(74) *Attorney, Agent, or Firm* — Schwegman Lundberg & Woessner, P.A.

(57) ABSTRACT

A method of forming an optical article includes the step of applying a silicone composition to a surface, wherein the silicone composition is a solid and has a glass transition temperature greater than room temperature. The silicone composition is heated to a temperature at or above the glass transition temperature such that the silicone composition flows. The silicone composition forms a light transmitting sheet upon cooling following the heating.

16 Claims, 9 Drawing Sheets

OPTICAL ARTICLE AND METHOD OF FORMING

CROSS-REFERENCE TO RELATED APPLICATIONS

This application is a U.S. national stage application filed under 35 U.S.C. §371 from International Application Serial No. PCT/US2013/021707, which was filed Jan. 16, 2013, and published as WO 2013/109607 on Jul. 25, 2013, and which claims the benefit of U.S. Provisional Patent Application Ser. No. 61/586,988, filed Jan. 16, 2012, titled "METHOD OF FORMING A LIGHT TRANSMITTING SHEET OF A SOLID STATE LIGHT," which applications and publication are incorporated by reference as if reproduced herein and made a part hereof in their entirety, and the benefit of priority of each of which is claimed herein.

FIELD OF THE DISCLOSURE

This disclosure generally relates to a method of forming an optical article. More specifically, the method includes the step of heating a solid silicone composition to a temperature at or above a glass transition temperature such that the silicone composition flows.

BACKGROUND OF THE DISCLOSURE

Many articles such as solid state lights and solar panels are formed using an encapsulant for protection from environmental factors. Such encapsulants are optically clear to promote light transmission efficiency and may variously be tough, durable, long lasting, and easy to apply. Many encapsulants used in solid state lights and solar panels rely on cure mechanisms that require catalysts, such as platinum catalysts. Many of these silicone encapsulants also require hydrocarbon groups to be present for cure. However, residual catalysts and hydrocarbon crosslinks may limit the thermal stability and/or long term durability of these silicone encapsulants.

In addition, many of the encapsulants are formed by dispensing liquid into a mold and heating the liquid to form the encapsulant. The use of liquids tends to allow air bubbles to form in the encapsulant, which may reduce or destroy commercial usefulness. For this reason, these encapsulants must be kept away from any dust, excessive air streams, etc. Accordingly, there remains opportunity for improvement.

SUMMARY OF THE DISCLOSURE

This disclosure provides a method of forming an optical article. The method includes the step of applying a silicone composition to a surface wherein the silicone composition is a solid and has a glass transition temperature. The method also includes the step of heating the silicone composition to a temperature at or above the glass transition temperature such that the silicone composition flows. The silicone composition may have a refractive index greater than 1.4 and include an organosiloxane block copolymer having a weight average molecular weight of at least 20,000 g/mole. The organosiloxane block copolymer may include 40 to 90 mole percent disiloxy units of the formula $[R^1_2SiO_{2/2}]$ arranged in linear blocks each having an average of from 10 to 400 disiloxy units $[R^1_2SiO_{2/2}]$ per linear block. The organosiloxane block copolymer may also include 10 to 60 mole percent trisiloxy units of the formula $[R^2SiO_{3/2}]$ arranged in non-linear blocks each having a weight average molecular weight of at least 500 g/mole. The organosiloxane block copolymer may further include 0.5 to 25 mole percent silanol groups [$\equiv$SiOH]. In the above formulae, $R^1$ is independently a $C_1$ to $C_{30}$ hydrocarbyl and $R^2$ is independently a $C_1$ to C20 hydrocarbyl. Moreover, at least 30 weight percent of the non-linear blocks are crosslinked with another non-linear block and aggregated in nano-domains. Even further, each linear block may be linked to at least one non-linear block.

In Embodiment 1, the invention relates to a method of forming an optical article, comprising: applying a silicone composition (e.g., a solid composition including a "resin-linear" organosiloxane block copolymer) to a surface, wherein the silicone composition is a solid and has a glass transition temperature greater than room temperature; and heating the silicone composition to a temperature at or above the glass transition temperature such that the silicone composition flows; wherein the silicone composition forms a light transmitting sheet upon cooling following the heating.

In Embodiment 2, the invention relates to the method of Embodiment 1, wherein the surface is an optical surface of an optical device.

In Embodiment 3, the invention relates to the method of Embodiment 2, wherein the silicone composition is a pellet, spheroid, ribbon, sheet, cube, powder, film, flake or sheet.

In Embodiment 4, the invention relates to the method of Embodiment 3, wherein the silicone composition is a sheet, wherein the sheet has a major surface, and wherein placing the sheet against the optical surface comprises placing the major surface of the sheet against the optical surface.

In Embodiment 5, the invention relates to the method of Embodiment 2, further comprising placing the optical device and at least a portion of the silicone composition in a mold.

In Embodiment 6, the invention relates to the method of Embodiment 5, wherein applying the silicone composition comprises placing the silicone composition against the optical surface of the optical device after the optical device has been placed in the mold.

In Embodiment 7, the invention relates to the method of Embodiment 6, wherein the silicone composition is positioned between the surface and a release liner.

In Embodiment 8, the invention relates to the method of Embodiment 7, further comprising clamping a first member of the mold against a second member of the mold, wherein the first and second members of the mold form a cavity; and wherein the placing the optical device and the silicone composition in the mold includes positioning the optical device and the silicone composition such that the optical device and at least a portion of the silicone composition are contained within the cavity upon clamping the first and second members of the mold.

In Embodiment 9, the invention relates to the method of Embodiment 8, wherein the release liner is proximate the first member of the mold and the optical device is proximate the second member of the mold.

In Embodiment 10, the invention relates to the method of Embodiment 1, wherein the surface is a surface of a mold.

In Embodiment 11, the invention relates to the method of Embodiment 10, further comprising securing the sheet with respect to an optical surface of an optical device to form, at least in part, an optical assembly.

In Embodiment 12, the invention relates to the method of Embodiment 11, wherein securing the sheet comprises placing the silicone composition against the optical surface after the optical device has been placed in a mold.

In Embodiment 13, the invention relates to the method of Embodiment 12, further comprising clamping a first member of the mold against a second member of the mold, wherein the first and second members of the mold form a cavity; and wherein the placing the optical device and the sheet in the mold includes positioning the optical device and the sheet such that the optical device and at least a portion of the sheet are contained within the cavity upon clamping the first and second members of the mold.

In Embodiment 14, the invention relates to the method of Embodiment 13, further comprising heating the sheet upon clamping the first and second members of the mold.

In Embodiment 15, the invention relates to the method of Embodiment 14, wherein heating the sheet is part of at least one of compression molding the sheet with respect to the optical surface, injection transfer molding the sheet with respect to the optical surface, and laminating the sheet with respect to the optical surface.

In Embodiment 16, the invention relates to the method of Embodiment 13, wherein the sheet is proximate the first member of the mold and the optical device is proximate the second member of the mold, and wherein the first member of the mold is configured to form the sheet into a predetermined configuration upon heating the sheet.

In Embodiment 17, the invention relates to the method of Embodiment 16, wherein the predetermined configuration is a lens.

In Embodiment 18, the invention relates to the method of Embodiment 12, wherein the sheet has a first major surface and a second major surface opposite the first major surface, and further comprising applying a release liner to the first major surface of the sheet, wherein placing the sheet against the optical surface comprises placing the second major surface against the optical surface.

In Embodiment 19, the invention relates to the method of Embodiment 18, further comprising removing the optical assembly from the mold by detaching the release liner from the sheet.

In Embodiment 20, the invention relates to the method of Embodiment 1, wherein the light transmitting sheet is substantially free of visible air bubbles.

In Embodiment 21, the invention relates to the method of Embodiments 1 or 20, wherein the light transmitting sheet has a light transmittance of at least 95% as determined using ASTM D1003.

In Embodiment 22, the invention relates to the method of any preceding Embodiment further comprising curing the silicone composition via a condensation reaction.

In Embodiment 23, the invention relates to the method of Embodiment 22, wherein the curing occurs at a temperature higher than the glass transition temperature of the silicone composition.

In Embodiment 24, the invention relates to the method of any preceding Embodiment, wherein the silicone composition has a refractive index greater than 1.4.

In Embodiment 25, the invention relates to the method of any preceding Embodiment, wherein the optical article is an optical detector.

In Embodiment 26, the invention relates to the method of any preceding Embodiment, wherein the silicone composition comprises an organosiloxane block copolymer having a weight average molecular weight of at least 20,000 g/mole and comprises:

40 to 90 mole percent disiloxy units of the formula $[R^1_2SiO_{2/2}]$ arranged in linear blocks each having an average of from 10 to 400 disiloxy units $[R^1_2SiO_{2/2}]$ per linear block;

10 to 60 mole percent trisiloxy units of the formula $[R_2SiO_{3/2}]$ arranged in non-linear blocks each having a weight average molecular weight of at least 500 g/mole; and 0.5 to 25 mole percent silanol groups [$\equiv$SiOH];

wherein $R^1$ is independently a $C_1$ to $C_{30}$ hydrocarbyl and $R^2$ is independently a $C_1$ to $C_{20}$ hydrocarbyl, wherein at least 30 weight percent of the non-linear blocks are crosslinked with another non-linear block and aggregated in nano-domains, and wherein each linear block is linked to at least one non-linear block.

In Embodiment 27, the invention relates to the method of Embodiment 26, wherein the disiloxy units have the formula $[(CH_3)(C_6H_5)SiO_{2/2}]$.

In Embodiment 28, the invention relates to the method of Embodiment 26 or 27, wherein the organosiloxane block copolymer comprises at least 30 weight percent disiloxy units.

In Embodiment 29, the invention relates to the method of Embodiments 26-28, wherein $R^2$ is phenyl.

In Embodiment 30, the invention relates to the method of any preceding Embodiment, wherein the silicone composition has a tensile strength greater than 1.0 MPa and an % elongation at break greater than 20% as determined using ASTM D412.

In Embodiment 31, the invention relates to the method of any preceding Embodiment, wherein the glass transition temperature of the silicone composition is from 25° C. to 200° C.

In Embodiment 32, the invention relates to the method of any preceding Embodiment, wherein the silicone composition has a storage modulus (G') at 25° C. of from 0.01 MPa to 500 MPa and a loss modulus (G") at 25° C. of from 0.001 MPa to 250 MPa.

In Embodiment 33, the invention relates to the method of Embodiment 32, wherein the silicone composition has a storage modulus (G') at 120° C. of from 10 Pa to 500,000 Pa and a loss modulus (G") at 120° C. of from 10 Pa to 500,000 Pa.

In Embodiment 34, the invention relates to the method of Embodiment 32 or 33, wherein the silicone composition has a storage modulus (G') at 200° C. of from 10 Pa to 100,000 Pa and a loss modulus (G") at 200° C. of from 5 Pa to 80,000 Pa.

In Embodiment 35, the invention relates to the method of any preceding Embodiment, wherein the light transmitting sheet has a thickness from 10 micrometers to 1 mm.

In Embodiment 36, the invention relates to the method of any preceding Embodiment, wherein the light transmitting sheet is a monolayer.

In Embodiment 37, the invention relates to the method of any preceding Embodiment, wherein the light transmitting sheet comprises two or more layers.

In Embodiment 38, the invention relates to the method of Embodiment 26, wherein the first outermost layer has a refractive index of at least 1.4 and comprises a phosphor and wherein the second outermost layer has a refractive index of at least 1.4.

In Embodiment 39, the invention relates to a composite article comprising first and second light transmitting sheets each independently formed by the method of any preceding Embodiment, wherein the first light transmitting sheet is a first outermost layer of the composite article and the second light transmitting sheet is a second outermost layer of the composite article.

DESCRIPTION OF THE FIGURES

Other advantages of the present disclosure will be appreciated, as the same becomes better understood by reference to the following detailed description when described in connection with the accompanying Figures.

DETAILED DESCRIPTION OF THE DISCLOSURE

This disclosure provides an optical article, such as an optical assembly (e.g., a solid state light) or a light transmitting sheet, and a method of forming the optical article. The optical assembly includes, in some embodiments, a light emitting diode and a composition that is a solid (hereafter described as the "solid composition"). In some embodiments, the optical assembly may be in various known applications, optocouplers; optical networks and data transmission; instrument panels and switches; courtesy lighting; turn and stop signals; household appliances; VCR/DVD/stereo/audio/video devices; toys/games instrumentation; security equipment; switches; architectural lighting; signage (e.g., channel letters); machine vision; retail displays; emergency lighting; neon and bulb replacement; flashlights; accent lighting; full color video, monochrome message boards; in traffic, rail, and aviation applications; in mobile phones, PDAs, digital cameras, lap tops; in medical instrumentation; bar code readers; color and money sensors; encoders; optical switches; fiber optic communication; and combinations thereof.

The optical devices can include coherent light sources, such as various lasers known in the art, as well as incoherent/partially coherent light sources, such as light emitting diodes (LED) and various types of LEDs, including semiconductor LEDs, organic LEDs, polymer LEDs, quantum dot LEDs, infrared LEDs, visible light LEDs (including colored and white light), ultraviolet LEDs, and combinations thereof.

Figure 1:
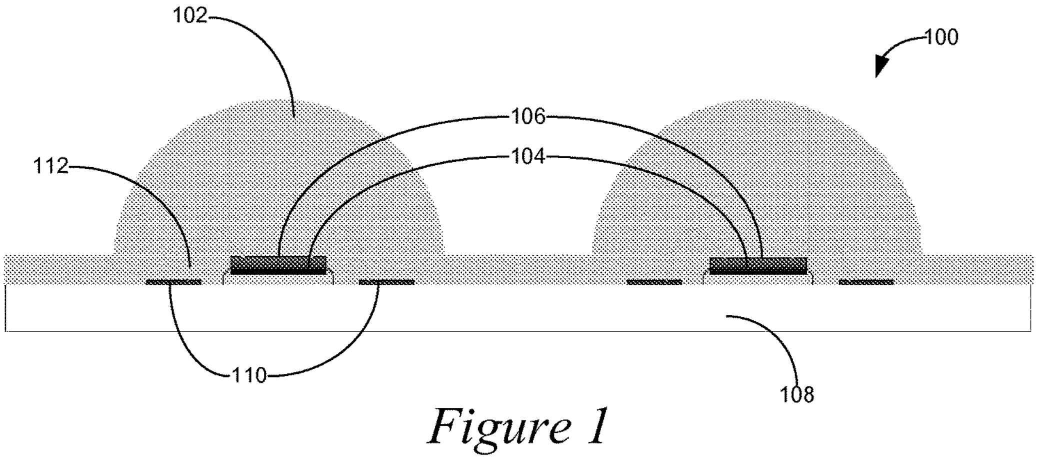
FIG. 1 is an abstract example of an optical assembly.

FIG. 1 is an abstract example of an optical assembly 100, such as a solid state light. The optical assembly includes an encapsulant 102 made from a solid silicone composition disclosed herein, optical devices 104, such as an LED, each having an optical surface 106 and each positioned on a substrate 108. The encapsulant 102 can be in the form of a light transmitting sheet. The light transmitting sheet can be generally flat (such as in the optical assembly 200 below) or can be in the form of a lens or other generally non-flat configuration as shown with respect to the encapsulant 102.

In some embodiments, the light transmitting sheet of the embodiments described herein are sheets that transmit all wavelengths of radiation, including ultraviolet (UV) radiation; visible light; and infrared (IR) radiation. In some embodiments, the light transmitting sheet transmits visible light, which includes light with wavelengths above 350 nm.

The optical device 104 is configured to emit light from the optical surface 106, such as generally orthogonal to the optical surface 106. The encapsulant 102 may be formed by hot-press and compression molding of the composition to the optical devices 104, as illustrated in a mold with dome-shape cavities. The optical assembly 100, as illustrated, further includes an electrode and/or electrical coupler 110 and wire connection 112 from the optical device 104. As illustrated, the composition of the encapsulant 102 is in direct contact with the optical device 104, such that no other compositions or materials are between the encapsulant 102 and the optical device 104 in at least one location. In various alternative examples, one or more additional materials may be disposed between the encapsulant 102 and the optical device 104.

Figure 2:
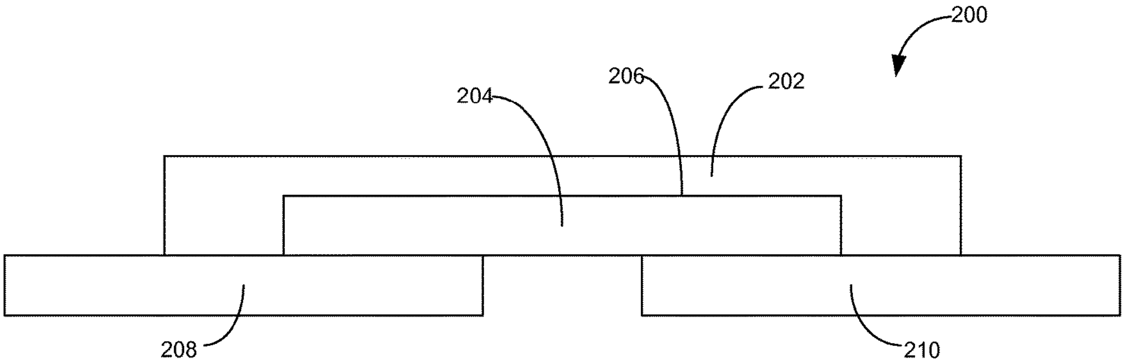
FIG. 2 is an abstract example of an optical assembly.

FIG. 2 is an abstract example of an optical assembly 200 that may be included in or that may form a solid state light. An encapsulant 202 covers an optical device 204, such as an LED. The encapsulant 202 is a solid silicone composition in the form of a light transmitting sheet. The optical device 204 has an optical surface 206 from which light is emitted during operation of the LED. It is noted that the optical assembly is not limited to solid state lights. In certain examples, the optical device 204 is an optical detector and the optical surface 206 receives rather than emits light. The optical device 204, as illustrated, is electrically coupled to and between electrodes (not pictured) respectively positioned on a first substrate 208 and a second substrate 210 at least partially isolated with respect to the first substrate 208.

The optical assemblies 100, 200 are purely illustrative and non-limiting. Various solid state lights, optical detectors, and other optical assemblies may be formed with the materials disclosed herein according to various processes. The optical assemblies may be formed to various specifications and be utilized for any of a variety of purposes.

The optical assembly may also include one or more layers or components known in the art, different from the aforementioned light transmitting sheet, as typically associated with optical assemblies. For example, the optical assembly may include one or more drivers, optics, heat sinks, housings, lenses, power supplies, fixtures, wires, electrodes, circuits, and the like.

The optical assembly also typically includes a substrate and/or a superstrate, also different from the light transmitting sheet. The substrate may provide protection to a rear surface of the optical assembly while a superstrate may provide protection to a front surface of the optical assembly. The substrate and the superstrate may be the same or may be different and each may independently include any suitable material known in the art. The substrate and/or superstrate may be soft and flexible or may be rigid and stiff. Alternatively, the substrate and/or superstrate may include rigid and stiff segments while simultaneously including soft and flexible segments. The substrate and/or superstrate may be transparent to light, may be opaque, or may not transmit light (i.e., may be impervious to light). Typically, the superstrate transmits light. In one embodiment, the substrate and/or superstrate includes glass. In another embodiment, the substrate and/or superstrate includes metal foils, polyimides, ethylene-vinyl acetate copolymers, and/or organic fluoropolymers including, but not limited to, ethylene tetrafluoroethylene (ETFE), Tedlar®, polyester/Tedlar®, Tedlar®/polyester/Tedlar®, polyethylene terephthalate (PET)

alone or coated with silicon and oxygenated materials (SiOx), and combinations thereof. In one embodiment, the substrate is further defined as a PET/SiOx-PET/Al substrate, wherein x has a value of from 1 to 4.

The substrate and/or superstrate may be load bearing or non-load bearing and may be included in any portion of the optical assembly. Typically, the substrate is load bearing. The substrate may be a "bottom layer" of the optical assembly that is typically positioned behind the light emitting diode and serves as mechanical support. Alternatively, the optical assembly may include a second or additional substrate and/or superstrate. The substrate may be the bottom layer of the optical assembly while a second substrate may be the top layer and function as the superstrate. Typically, the second substrate (e.g. a second substrate functioning as a superstrate is transparent to the light (e.g. visible, UV, and/or infrared light) and is positioned on top of the substrate. The second substrate may be used to protect the optical assembly from environmental conditions such as rain, snow, and heat. In one embodiment, the second substrate functions as a superstrate and is a rigid glass panel that is transparent to light and is used to protect the front surface of the optical assembly.

In addition, the optical assembly may also include one or more tie layers, also different from the light transmitting sheet. The one or more tie layers may be disposed on the substrate to adhere the light emitting diode to the substrate. In one embodiment, the optical assembly does not include a substrate and does not include a tie layer. The tie layer may be transparent to UV, infrared, and/or visible light. However, the tie layer may be impermeable to light or opaque. The tie layer may be tacky and may be a gel, gum, liquid, paste, resin, or solid. In one embodiment, the tie layer is a film.

Moreover, the optical assembly may include a phosphor. The phosphor is not particularly limited and may include any known in the art. In one embodiment, the phosphor is made from a host material and an activator, such as copper-activated zinc sulfide and silver-activated zinc sulfide. Suitable but non-limiting host materials include oxides, nitrides and oxynitrides, sulfides, selenides, halides or silicates of zinc, cadmium, manganese, aluminum, silicon, or various rare earth metals. Additional suitable phosphors include, but are not limited to, $Zn_2SiO_4$:Mn (Willemite); ZnS:Ag+(Zn,Cd)S:Ag; ZnS:Ag+ZnS:Cu+$Y_2O_2S$:Eu; ZnO:Zn; KCl; ZnS:Ag,Cl or ZnS:Zn; (KF,$MgF_2$):Mn; (Zn,Cd)S:Ag or (Zn,Cd)S:Cu; $Y_2O_2S$:Eu+$Fe_2$O3, ZnS:Cu,Al; ZnS:Ag+Co-on-$Al_2O_3$; (KF,$MgF_2$):Mn; (Zn,Cd)S:Cu,Cl; ZnS:Cu or ZnS:Cu,Ag; $MgF_2$:Mn; (Zn,Mg)$F_2$:Mn; $Zn_2SiO_4$:Mn,As; ZnS:Ag+(Zn,Cd)S:Cu; $Gd_2O_2S$:Tb; $Y_2O_2S$:Tb; $Y_3Al_5O_{12}$:Ce; $Y_2SiO_5$:Ce; $Y_3Al_5O_{12}$:Tb; ZnS:Ag,Al; ZnS:Ag; ZnS:Cu,Al or ZnS:Cu,Au,Al; (Zn,Cd)S:Cu,Cl+(Zn,Cd)S:Ag,Cl; $Y_2SiO_5$:Tb; $Y_2OS$:Tb; $Y_3(Al,Ga)_5O_{12}$:Ce; $Y_3(Al,Ga)_5O_{12}$:Tb; $InBO_3$:Tb; $InBO_3$:Eu; $InBO_3$:Tb+$InBO_3$:Eu; $InBO_3$:Tb+$InBO_3$:Eu+ZnS:Ag; (Ba,Eu)$Mg_2Al_{16}O_{27}$; (Ce,Tb)$MgAl_{11}O_{19}$; $BaMgAl_{10}O_{17}$:Eu,Mn; $BaMg_2Al_{16}O_{27}$:Eu(II); $BaMgAl_{10}O_{17}$:Eu,Mn; $BaMg_2Al_{16}O_{27}$:Eu(II),Mn(II); $Ce_{0.67}Tb_{0.33}MgAl_{11}O_{19}$:Ce,Tb; $Zn_2SiO_4$:Mn,$Sb_2O_3$; $CaSiO_3$:Pb,Mn; $CaWO_4$ (Scheelite); $CaWO_4$:Pb; $MgWO_4$; $(Sr,Eu,Ba,Ca)_5(PO4)_3Cl$; $Sr_5Cl(PO_4)_3$:Eu(II); $(Ca,Sr,Ba)_3(PO_4)_2Cl_2$:Eu; $(Sr,Ca,Ba)_{10}(PO_4)_6Cl_2$:Eu; $Sr_2P_2O_7$:Sn(II); $Sr_6P_5BO_{20}$:Eu; $Ca_5F(PO_4)_3$:Sb; $(Ba,TO_2P_2O_7$:Ti; $3Sr_3(PO_4)_2.SrF_2$:Sb,Mn; $Sr_5F(PO_4)_3$:Sb,Mn; $Sr_5F(PO_4)_3$:Sb,Mn; $LaPO_4$:Ce,Tb; (La,Ce,Tb)$PO_4$; (La,Ce,Tb)$PO_4$:Ce,Tb; $Ca_3(PO_4)_2.CaF_2$:Ce,Mn; $(Ca,Zn,Mg)_3(PO_4)_2$:Sn; $(Zn,Sr)_3(PO_4)_2$:Mn; $(Sr,Mg)_3(PO_4)_2$:Sn; $(Sr,Mg)_3(PO_4)_2$:Sn(II); $Ca_5F(PO_4)_3$:Sb,Mn; $Ca_5(F,Cl)(PO_4)_3$:Sb,Mn; $(Y,Eu)_2O_3$; $Y_2O_3$:Eu(III); $Mg_4(F)GeO_6$:Mn; $Mg_4(F)(Ge,Sn)O_6$:Mn; $Y(P,V)O_4$:Eu; $YVO_4$:Eu; $Y_2O_2S$:Eu; 3.5 MgO.0.5 $MgF_2.GeO_2$:Mn; $Mg_5As_2O_{11}$:Mn; $SrAl_2O_7$:Pb; $LaMgAl_{11}O_{19}$:Ce; $LaPO_4$:Ce; $SrAl_{12}O_{19}$:Ce; $BaSi_2O_5$:Pb; $SrFB_2O_3$:Eu(II); $SrB_4O_7$:Eu; $Sr_2MgSi_2O_7$:Pb; $MgGa_2O_4$:Mn(II); $Gd_2O_2S$:Tb; $Gd_2O_2S$:Eu; $Gd_2O_2S$:Pr; $Gd_2O_2S$:Pr,Ce,F; $Y_2O_2S$:Tb; $Y_2O_2S$:Eu; $Y_2O_2S$:Pr; Zn(0.5)Cd(0.4)S:Ag; Zn(0.4)Cd(0.6)S:Ag; $CdWO_4$; $CaWO_4$; $MgWO_4$; $Y_2SiO_5$:Ce; $YAlO_3$:Ce; $Y_3Al_5O_{12}$:Ce; $Y_3(Al,Ga)_5O_{12}$:Ce; CdS:In; ZnO:Ga; ZnO:Zn; (Zn,Cd)S:Cu,Al; ZnS:Cu,Al,Au; ZnCdS:Ag,Cu; ZnS:Ag; anthracene, EJ-212, $Zn_2SiO_4$:Mn; ZnS:Cu; NaI:Tl; CsI:Tl; LiF/ZnS:Ag; LiF/ZnSCu,Al,Au, and combinations thereof.

The phosphor may be present in any portion of the optical assembly. In one embodiment, the phosphor is present in a lens. In another embodiment, the phosphor is present in a layer. In still another embodiment, the phosphor is present in a solid composition itself, as described in greater detail below. The phosphor may be present in the light transmitting sheet.

The light transmitting sheet is formed using methodologies that include the step of applying a solid silicone composition to a surface. In various examples, the surface is one of an optical surface of an optical device and the resultant light transmitting sheet is formed in situ as part of the assembly of an optical assembly, such as optical assemblies 100, 200. In such examples, the solid silicone composition can be applied on the optical surface in a variety of solid forms, as disclosed in detail below. In various additional examples, the light transmitting sheet is formed without respect to an optical assembly. In such examples, the light transmitting sheet can be formed from the various solid silicone compositions disclosed below, following which the light transmitting sheet may subsequently be applied in a variety of circumstances in which a light transmitting sheet may be utilized, including but not necessarily limited to optical assemblies.

The silicone composition is a solid (hereinafter described as the "solid composition"). The solid composition is "solid," as understood in the art. For example, the solid composition has structural rigidity, resists to changes of shape or volume, and is not a liquid or a gel. In one example, the solid composition is a film. Alternatively, the solid composition may be a pellet, spheroid, ribbon, sheet, cube, powder (e.g., a powder having an average particle size of not more than 500 μm, including a powder having an average particle size of from about 5 to about 500 μm; from about 10 to about 100 μm; from about 10 to about 50 μm; from about 30 to about 100 μm; from about 50 to about 100 μm; from about 50 to about 250 μm; from about 100 to about 500 μm; from about 150 to about 300 μm; or from about 250 to about 500 μm), etc. The dimensions of the solid composition are not particularly limited. Said differently, the film, sheet, pellet, etc. may be of any dimensions. In various embodiments, the solid composition is as described in described in U.S. Provisional Patent Application Ser. No. 61/581,852, filed Dec. 30, 2011 and PCT Application No. PCT/US2012/071011, filed Dec. 30, 2012, both of which are hereby expressly incorporated herein by reference.

The solid composition typically has two glass transition temperatures ($T_g$), one associated with soft block components and one associated with hard block components. As used herein, $T_g$ is assessed using a differential scanning calorimeter (DSC). For example, a TA Instruments Q2000 (DSC) may be used to measure the glass transition ($T_g$). Typically a 10 mg sample is heated at 20° C./min using helium as a purge gas (25 mL/min). The $T_g$ is typically calculated using the step midpoint at half extrapolated tangents. Typically, the higher of the two glass transition temperatures of the solid composition is from −30 to 200, from 0 to 130, from 25 to 150, or from 40 to 120° C. At temperatures above this higher of the two glass transition temperatures, the solid composition softens and flow. In various embodiments, the lower of the two glass transition temperatures of the solid composition is from −130° C. to 25° C., from −130° C. to 0° C., or from −130° C. to −10° C.

The solid composition includes an organosiloxane block copolymer that may also be described as a "resin-linear" organosiloxane block copolymer. The organosiloxane block copolymers comprises:

40 to 90 mole percent disiloxy units of the formula $[R^1_2SiO_{2/2}]$, 10 to 60 mole percent trisiloxy units of the formula $[R^2SiO_{3/2}]$, 0.5 to 25 mole percent silanol groups [≡SiOH];

wherein:

$R^1$ is independently a $C_1$ to $C_{30}$ hydrocarbyl, $R^2$ is independently a $C_1$ to $C_{20}$hydrocarbyl;

wherein:

the disiloxy units $[R^1_2SiO_{2/2}]$ are arranged in linear blocks having an average of from 10 to 400 disiloxy units $[R^1_2SiO_{2/2}]$ per linear block, the trisiloxy units $[R^2SiO_{3/2}]$ are arranged in non-linear blocks having a molecular weight of at least 500 g/mole, at least 30% of the non-linear blocks are crosslinked with each other and are predominately aggregated together in nano-domains, each linear block is linked to at least one non-linear block; and the organosiloxane block copolymer has a weight average molecular weight of at least 20,000 g/mole, and is a solid at 25° C.

The organosiloxane block copolymer of some of the embodiments described herein are referred to as "resin-linear" organosiloxane block copolymers and include siloxy units independently selected from $(R_3SiO_{1/2})$, $(R_2SiO_{2/2})$, $(RSiO_{3/2})$, or $(SiO_{4/2})$ siloxy units, where R may be any organic group. These siloxy units are commonly referred to as M, D, T, and Q units respectively. These siloxy units can be combined in various manners to form cyclic, linear, or branched structures. The chemical and physical properties of the resulting polymeric structures vary depending on the number and type of siloxy units in the organopolysiloxane. For example, "linear" organopolysiloxanes typically contain mostly D, or $(R_2SiO_{2/2})$ siloxy units, which results in polydiorganosiloxanes that are fluids of varying viscosities, depending on the "degree of polymerization" or DP as indicated by the number of D units in the polydiorganosiloxane. "Linear" organopolysiloxanes typically have glass transition temperatures ($T_g$) that are lower than 25° C. "Resin" organopolysiloxanes result when a majority of the siloxy units are selected from T or Q siloxy units. When T siloxy units are predominately used to prepare an organopolysiloxane, the resulting organosiloxane is often referred to as a "resin" or a "silsesquioxane resin". Increasing the amount of T or Q siloxy units in an organopolysiloxane typically results in polymers having increasing hardness and/or glass like properties. "Resin" organopolysiloxanes thus have higher $T_g$ values, for example siloxane resins often have $T_g$ values greater than 40° C., e.g., greater than 50° C., greater than 60° C., greater than 70° C., greater than 80° C., greater than 90° C. or greater than 100° C. In some embodiments, $T_g$ for siloxane resins is from about 60° C. to about 100° C., e.g., from about 60° C. to about 80° C., from about 50° C. to about 100° C., from about 50° C. to about 80° C. or from about 70° C. to about 100° C.

As used herein "organosiloxane block copolymers" or "resin-linear organosiloxane block copolymers" refer to organopolysiloxanes containing "linear" D siloxy units in combination with "resin" T siloxy units. In some embodiments, the organosiloxane copolymers are "block" copolymers, as opposed to "random" copolymers. As such, the "resin-linear organosiloxane block copolymers" of the disclosed embodiments refer to organopolysiloxanes containing D and T siloxy units, where the D units (i.e., $[R^1_2SiO_{2/2}]$ units) are primarily bonded together to form polymeric chains having, in some embodiments, an average of from 10 to 400 D units (e.g., about 10 to about 400 D units; about 10 to about 300 D units; about 10 to about 200 D units; about 10 to about 100 D units; about 50 to about 400 D units; about 100 to about 400 D units; about 150 to about 400 D units; about 200 to about 400 D units; about 300 to about 400 D units; about 50 to about 300 D units; about 100 to about 300 D units; about 150 to about 300 D units; about 200 to about 300 D units; about 100 to about 150 D units, about 115 to about 125 D units, about 90 to about 170 D units or about 110 to about 140 D units), which are referred herein as "linear blocks".

The T units (i.e., $[R^2SiO_{3/2}]$) are primarily bonded to each other to form branched polymeric chains, which are referred to as "non-linear blocks". In some embodiments, a significant number of these non-linear blocks may further aggregate to form "nano-domains" when solid forms of the block copolymer are provided. In some embodiments, these nano-domains form a phase separate from a phase formed from linear blocks having D units, such that a resin-rich phase forms. In some embodiments, the disiloxy units $[R^1_2SiO_{2/2}]$ are arranged in linear blocks having an average of from 10 to 400 disiloxy units $[R^1_2SiO_{2/2}]$ per linear block (e.g., about 10 to about 400 D units; about 10 to about 300 D units; about 10 to about 200 D units; about 10 to about 100 D units; about 50 to about 400 D units; about 100 to about 400 D units; about 150 to about 400 D units; about 200 to about 400 D units; about 300 to about 400 D units; about 50 to about 300 D units; about 100 to about 300 D units; about 150 to about 300 D units; about 200 to about 300 D units; about 100 to about 150 D units, about 115 to about 125 D units, about 90 to about 170 D units or about 110 to about 140 D units), and the trisiloxy units $[R^2SiO_{3/2}]$ are arranged in non-linear blocks having a molecular weight of at least 500 g/mole and at least 30% of the non-linear blocks are crosslinked with each other.

The aforementioned formulas may be alternatively described as $[R^1_2SiO_{2/2}]_a[R^2SiO_{3/2}]_b$ where the subscripts a and b represent the mole fractions of the siloxy units in the organosiloxane block copolymer. In these formulas, a may vary from 0.4 to 0.9, alternatively from 0.5 to 0.9, and alternatively from 0.6 to 0.9. Also in these formulas, b can vary from 0.1 to 0.6, alternatively from 0.1 to 0.5 and alternatively from 0.1 to 0.4.

$R^1$ in the above disiloxy unit formula is independently a $C_1$ to $C_{30}$ hydrocarbyl. The hydrocarbon group may independently be an alkyl, aryl, or alkylaryl group. As used herein, hydrocarbyl also includes halogen substituted hydrocarbyls, where the halogen may be chlorine, fluorine, bromine or combinations thereof. $R^1$ may be a $C_1$ to $C_{30}$ alkyl group, alternatively $R^1$ may be a $C_1$ to $C_{18}$ alkyl group. Alternatively $R^1$ may be a $C_1$ to $C_6$ alkyl group such as methyl, ethyl, propyl, butyl, pentyl, or hexyl. Alternatively $R^1$ may be methyl. $R^1$ may be an aryl group, such as phenyl, naphthyl, or an anthryl group. Alternatively, $R^1$ may be any combination of the aforementioned alkyl or aryl groups. Alternatively, $R^1$ is phenyl, methyl, or a combination of both.

Each $R^2$ in the above trisiloxy unit formula is independently a $C_1$ to $C_{20}$ hydrocarbyl. As used herein, hydrocarbyl also includes halogen substituted hydrocarbyls, where the halogen may be chlorine, fluorine, bromine or combinations thereof. $R^2$ may be an aryl group, such as phenyl, naphthyl, anthryl group. Alternatively, $R^2$ may be an alkyl group, such as methyl, ethyl, propyl, or butyl. Alternatively, $R^2$ may be any combination of the aforementioned alkyl or aryl groups. Alternatively, $R^2$ is phenyl or methyl.

The organosiloxane block copolymer may include additional siloxy units, such as M siloxy units, Q siloxy units, other unique D or T siloxy units (e.g. having a organic groups other than $R^1$ or $R^2$), so long as the organosiloxane block copolymer includes the mole fractions of the disiloxy and trisiloxy units as described above. In other words, the sum of the mole fractions as designated by subscripts a and b, do not necessarily have to sum to one. The sum of a+b may be less than one to account for amounts of other siloxy units that may be present in the organosiloxane block copolymer. For example, the sum of a+b may be greater than 0.6, greater than 0.7, greater than 0.8, greater than 0.9, greater than 0.95, or greater than 0.98 or 0.99.

In one embodiment, the organosiloxane block copolymer consists essentially of the disiloxy units of the formula $R^1_2SiO_{2/2}$ and trisiloxy units of the formula $R^2SiO_{3/2}$, in the aforementioned weight percentages, while also including 0.5 to 25 mole percent silanol groups [$\equiv$SiOH], wherein $R^1$ and $R^2$ are as described above. Thus, in this embodiment, the sum of a+b (when using mole fractions to represent the amount of disiloxy and trisiloxy units in the copolymer) is greater than 0.95, alternatively greater than 0.98. Moreover, in this embodiment, the terminology "consisting essentially of" describes that the organosiloxane block copolymer is free of other siloxane units not described herein.

The formula $[R^1_2SiO_{2/2}]_a[R^2SiO_{3/2}]_b$, and related formulae using mole fractions, as described herein, do not limit the structural ordering of the disiloxy $R^1_2SiO_{2/2}$ and trisiloxy $R^2SiO_{3/2}$ units in the organosiloxane block copolymer. Rather, these formulae provide a non-limiting notation to describe the relative amounts of the two units in the organosiloxane block copolymer, as per the mole fractions described above via the subscripts a and b. The mole fractions of the various siloxy units in the organosiloxane block copolymer, as well as the silanol content, may be determined by $^{29}$Si NMR techniques.

In some embodiments, the organosiloxane block copolymers contained in the solid forms and solid compositions comprise 40 to 90 mole percent disiloxy units of the formula $[R^1_2SiO_{2/2}]$, e.g., 50 to 90 mole percent disiloxy units of the formula $[R^1_2SiO_{2/2}]$; 60 to 90 mole percent disiloxy units of the formula $[R^1_2SiO_{2/2}]$; 65 to 90 mole percent disiloxy units of the formula $[R^1_2SiO_{2/2}]$; 70 to 90 mole percent disiloxy units of the formula $[R^1_2SiO_{2/2}]$; or 80 to 90 mole percent disiloxy units of the formula $[R^1_2SiO_{2/2}]$; 40 to 80 mole percent disiloxy units of the formula $[R^1_2SiO_{2/2}]$; 40 to 70 mole percent disiloxy units of the formula $[R^1_2SiO_{2/2}]$; 40 to 60 mole percent disiloxy units of the formula $[R^1_2SiO_{2/2}]$; 40 to 50 mole percent disiloxy units of the formula $[R^1_2SiO_{2/2}]$; 50 to 80 mole percent disiloxy units of the formula $[R^1_2SiO_{2/2}]$; 50 to 70 mole percent disiloxy units of the formula $[R^1_2SiO_{2/2}]$; 50 to 60 mole percent disiloxy units of the formula $[R^1_2SiO_{2/2}]$; 60 to 80 mole percent disiloxy units of the formula $[R^1_2SiO_{2/2}]$; 60 to 70 mole percent disiloxy units of the formula $[R^1_2SiO_{2/2}]$; or 70 to 80 mole percent disiloxy units of the formula $[R^1_2SiO_{2/2}]$.

In some embodiments, the organosiloxane block copolymers contained in the solid forms and solid compositions comprise 10 to 60 mole percent trisiloxy units of the formula $[R^2SiO_{3/2}]$, e.g., 10 to 20 mole percent trisiloxy units of the formula $[R^2SiO_{3/2}]$; 10 to 30 mole percent trisiloxy units of the formula $[R^2SiO_{3/2}]$; 10 to 35 mole percent trisiloxy units of the formula $[R^2SiO_{3/2}]$; 10 to 40 mole percent trisiloxy units of the formula $[R^2SiO_{3/2}]$; 10 to 50 mole percent trisiloxy units of the formula $[R^2SiO_{3/2}]$; 20 to 30 mole percent trisiloxy units of the formula $[R^2SiO_{3/2}]$; 20 to 35 mole percent trisiloxy units of the formula $[R^2SiO_{3/2}]$; 20 to 40 mole percent trisiloxy units of the formula $[R^2SiO_{3/2}]$; 20 to 50 mole percent trisiloxy units of the formula $[R^2SiO_{3/2}]$; 20 to 60 mole percent trisiloxy units of the formula $[R^2SiO_{3/2}]$; 30 to 40 mole percent trisiloxy units of the formula $[R^2SiO_{3/2}]$; 30 to 50 mole percent trisiloxy units of the formula $[R^2SiO_{3/2}]$; 30 to 60 mole percent trisiloxy units of the formula $[R^2SiO_{3/2}]$; 40 to 50 mole percent trisiloxy units of the formula $[R^2SiO_{3/2}]$; or 40 to 60 mole percent trisiloxy units of the formula $[R^2SiO_{3/2}]$.

In some embodiments, the organosiloxane block copolymers contained in the solid forms and solid compositions comprise 0.5 to 25 mole percent silanol groups [$\equiv$SiOH] (e.g., 0.5 to 5 mole percent, 0.5 to 10 mole percent, 0.5 to 15 mole percent, 0.5 to 20 mole percent, 5 to 10 mole percent, 5 to 15 mole percent, 5 to 20 mole percent, 5 to 25 mole percent, 10 to 15 mole percent 10 to 20 mole percent, 10 to 25 mole percent, 15 to 20 mole percent, 15 to 25 mole percent, or 20 to 25 mole percent). The silanol groups present on the resin component of the organosiloxane block copolymer may allow the organosiloxane block copolymer to further react or cure at elevated temperatures or to cross-link. The crosslinking of the non-linear blocks may be accomplished via a variety of chemical mechanisms and/or moieties. For example, crosslinking of non-linear blocks within the organosiloxane block copolymer may result from the condensation of residual silanol groups present in the non-linear blocks of the organosiloxane block copolymer.

In some embodiments, the disiloxy units $[R^1_2SiO_{2/2}]$ in the organosiloxane block copolymers contained in the solid forms and solid compositions are arranged in linear blocks having an average of 10 to 400 disiloxy units, e.g., about 10 to about 400 disiloxy units; about 10 to about 300 disiloxy units; about 10 to about 200 disiloxy units; about 10 to about 100 disiloxy units; about 50 to about 400 disiloxy units; about 100 to about 400 disiloxy units; about 150 to about 400 disiloxy units; about 200 to about 400 disiloxy units; about 300 to about 400 disiloxy units; about 50 to about 300 disiloxy units; about 100 to about 300 disiloxy units; about 150 to about 300 disiloxy units; about 200 to about 300 disiloxy units; about 100 to about 150 disiloxy units, about 115 to about 125 disiloxy units, about 90 to about 170 disiloxy units or about 110 to about 140 disiloxy units.

In some embodiments, the non-linear blocks in the organosiloxane block copolymers contained in the solid forms and solid compositions have a number average molecular weight of at least 500 g/mole, e.g., at least 1000 g/mole, at least 2000 g/mole, at least 3000 g/mole or at least 4000 g/mole; or have a molecular weight of from about 500 g/mole to about 4000 g/mole, from about 500 g/mole to about 3000 g/mole, from about 500 g/mole to about 2000 g/mole, from about 500 g/mole to about 1000 g/mole, from about 1000 g/mole to 2000 g/mole, from about 1000 g/mole to about 1500 g/mole, from about 1000 g/mole to about 1200 g/mole, from about 1000 g/mole to 3000 g/mole, from about 1000 g/mole to about 2500 g/mole, from about 1000 g/mole to about 4000 g/mole, from about 2000 g/mole to about 3000 g/mole or from about 2000 g/mole to about 4000 g/mole.

In some embodiments, at least 30% of the non-linear blocks in the organosiloxane block copolymers contained in the solid forms and solid compositions are crosslinked with each other, e.g., at least 40% of the non-linear blocks are crosslinked with each other; at least 50% of the non-linear blocks are crosslinked with each other; at least 60% of the non-linear blocks are crosslinked with each other; at least 70% of the non-linear blocks are crosslinked with each other; or at least 80% of the non-linear blocks are crosslinked with each other. In other embodiments, from about 30% to about 80% of the non-linear blocks are crosslinked with each other; from about 30% to about 70% of the non-linear blocks are crosslinked with each other; from about 30% to about 60% of the non-linear blocks are crosslinked with each other; from about 30% to about 50% of the non-linear blocks are crosslinked with each other; from about 30% to about 40% of the non-linear blocks are crosslinked with each other; from about 40% to about 80% of the non-linear blocks are crosslinked with each other; from about 40% to about 70% of the non-linear blocks are crosslinked with each other; from about 40% to about 60% of the non-linear blocks are crosslinked with each other; from about 40% to about 50% of the non-linear blocks are crosslinked with each other; from about 50% to about 80% of the non-linear blocks are crosslinked with each other; from about 50% to about 70% of the non-linear blocks are crosslinked with each other; from about 55% to about 70% of the non-linear blocks are crosslinked with each other; from about 50% to about 60% of the non-linear blocks are crosslinked with each other; from about 60% to about 80% of the non-linear blocks are crosslinked with each other; or from about 60% to about 70% of the non-linear blocks are crosslinked with each other.

In some embodiments, the organosiloxane block copolymers contained in the solid forms and solid compositions have a weight average molecular weight ($M_w$) of at least 20,000 g/mole, alternatively a weight average molecular weight of at least 40,000 g/mole, alternatively a weight average molecular weight of at least 50,000 g/mole, alternatively a weight average molecular weight of at least 60,000 g/mole, alternatively a weight average molecular weight of at least 70,000 g/mole, or alternatively a weight average molecular weight of at least 80,000 g/mole. In some embodiments, the organosiloxane block copolymers contained in the solid forms and solid compositions have a weight average molecular weight ($M_w$) of from about 20,000 g/mole to about 250,000 g/mole or from about 100,000 g/mole to about 250,000 g/mole, alternatively a weight average molecular weight of from about 40,000 g/mole to about 100,000 g/mole, alternatively a weight average molecular weight of from about 50,000 g/mole to about 100,000 g/mole, alternatively a weight average molecular weight of from about 50,000 g/mole to about 80,000 g/mole, alternatively a weight average molecular weight of from about 50,000 g/mole to about 70,000 g/mole, alternatively a weight average molecular weight of from about 50,000 g/mole to about 60,000 g/mole. In other embodiments, the weight average molecular weight of the organosiloxane block copolymers contained in the solid forms and solid compositions is from 40,000 to 100,000, from 50,000 to 90,000, from 60,000 to 80,000, from 60,000 to 70,000, of from 100,000 to 500,000, of from 150,000 to 450,000, of from 200,000 to 400,000, of from 250,000 to 350,000, or from 250,000 to 300,000, g/mole. In still other embodiments, the organosiloxane block copolymer has a weight average molecular weight of from 40,000 to 60,000, from 45,000 to 55,000, or about 50,000, g/mole.

In some embodiments, the organosiloxane block copolymers of some of the embodiments described herein have a number average molecular weight ($M_n$) of from about 15,000 to about 50,000 g/mole; from about 15,000 to about 30,000 g/mole; from about 20,000 to about 30,000 g/mole; or from about 20,000 to about 25,000 g/mole.

In some embodiments, the aforementioned organosiloxane block copolymers are isolated in a solid form, for example by casting films of a solution of the block copolymer in an organic solvent (e.g., benzene, toluene, xylene or combinations thereof) and allowing the solvent to evaporate. Under these conditions, the aforementioned organosiloxane block copolymers can be provided as solutions in an organic solvent containing from about 50 wt % to about 80 wt % solids, e.g., from about 60 wt % to about 80 wt %, from about 70 wt % to about 80 wt % or from about 75 wt % to about 80 wt % solids. In some embodiments, the solvent is toluene. In some embodiments, such solutions will have a viscosity of from about 1500 cSt to about 4000 cSt at 25° C., e.g., from about 1500 cSt to about 3000 cSt, from about 2000 cSt to about 4000 cSt or from about 2000 cSt to about 3000 cSt at 25° C.

Upon drying or forming a solid, the non-linear blocks of the block copolymer further aggregate together to form "nano-domains" As used herein, "predominately aggregated" means the majority of the non-linear blocks of the organosiloxane block copolymer are found in certain regions of the solid composition, described herein as "nano-domains". As used herein, "nano-domains" refers to those phase regions within the solid block copolymer compositions that are phase separated within the solid block copolymer compositions and possess at least one dimension sized from 1 to 100 nanometers. The nano-domains may vary in shape, providing at least one dimension of the nano-domain is sized from 1 to 100 nanometers. Thus, the nano-domains may be regular or irregularly shaped. The nano-domains may be spherically shaped, tubular shaped, and in some instances lamellar shaped.

In a further embodiment, the solid organosiloxane block copolymers as described above contain a first phase and an incompatible second phase, the first phase containing predominately the disiloxy units $[R^1_2SiO_{2/2}]$ as defined above, the second phase containing predominately the trisiloxy units $[R^2SiO_{3/2}]$ as defined above, the non-linear blocks being sufficiently aggregated into nano-domains which are incompatible with the first phase.

When solid compositions are formed from curable compositions of the organosiloxane block copolymers of some of the embodiments described herein, which, in some embodiments also contain an organosiloxane resin (e.g., free resin that is not part of the block copolymer), the organosiloxane resin also predominately aggregates within the nano-domains.

The structural ordering of the disiloxy and trisiloxy units in the solid block copolymers of the present disclosure, and characterization of the nano-domains, may be determined explicitly using certain analytical techniques such as Transmission Electron Microscopic (TEM) techniques, Atomic Force Microscopy (AFM), Small Angle Neutron Scattering, Small Angle X-Ray Scattering, and Scanning Electron Microscopy.

Alternatively, the structural ordering of the disiloxy and trisiloxy units in the block copolymer, and formation of nano-domains, may be implied by characterizing certain physical properties of coatings resulting from the present organosiloxane block copolymers. For example, the present organosiloxane copolymers may provide coatings that have an optical transmittance of visible light greater than 95%. One skilled in the art recognizes that such optical clarity is possible (other than refractive index matching of the two phases) only when visible light is able to pass through such a medium and not be diffracted by particles (or domains as used herein) having a size greater than 150 nanometers. As the particle size, or domains further decreases, the optical clarity may be further improved. Thus, coatings derived from the present organosiloxane copolymers may have an optical transmittance of visible light of at least 95%, e.g., at least 96%; at least 97%; at least 98%; at least 99%; or 100% transmittance of visible light. As used herein, the term "visible light" includes light with wavelengths above 350 nm.

The solid composition of this disclosure may include phase separated "soft" and "hard" segments resulting from blocks of linear D units and aggregates of blocks of non-linear T units, respectively. These respective soft and hard segments may be determined or inferred by differing glass transition temperatures ($T_g$). Thus a linear segment may be described as a "soft" segment typically having a low $T_g$, for example less than 25° C., alternatively less than 0° C., or alternatively even less than −20° C. The linear segments typically maintain "fluid" like behavior in a variety of conditions. Conversely, non-linear blocks may be described as "hard segments" having higher $T_g$, values, for example greater than 30° C., alternatively greater than 40° C., or alternatively even greater than 50° C.

The advantage of the present resin-linear organopolysiloxanes block copolymers is that they can be processed several times, because the processing temperature ($T_{processing}$) is less than the temperature required to finally cure ($T_{cure}$) the organosiloxane block copolymer, i.e., $T_{processing}<T_{cure}$. However the organosiloxane copolymer will cure and achieve high temperature stability when $T_{processing}$ is taken above $T_{cure}$. Thus, the present resin-linear organopolysiloxanes block copolymers offer the significant advantage of being "re-processable" in conjunction with the benefits typically associated with silicones, such as; hydrophobicity, high temperature stability, moisture/UV resistance.

In one embodiment, a linear soft block siloxane unit, e.g., with a degree of polymerization (dp)>2 (e.g., dp>10; dp>50; dp>100; dp>150; or dp from about 2 to about 150; dp from about 50 to about 150; or dp from about 70 to about 150) is grafted to a linear or resinous "hard block" siloxane unit with a glass transition above room temperature. In a related embodiment, the organosiloxane block copolymer (e.g., silanol terminated organosiloxane block copolymer) is reacted with a silane, such as methyl triacetoxy silane and/or methyl trioxime silane, followed by reaction with a silanol functional phenyl silsesquioxane resin. In still other embodiments, the organosiloxane block copolymer includes one or more soft blocks (e.g., blocks with glass transition<25° C.) and one or more linear siloxane "pre-polymer" blocks that, in some embodiments, include aryl groups as side chains (e.g., poly(phenyl methyl siloxane). In another embodiment, the organosiloxane block copolymer includes PhMe-D contents>20 mole % (e.g., >30 mole %; >40 mole %; >50 mole %; or from about 20 to about 50 mole %; about 30 to about 50 mole %; or from about 20 to about 30 mole %); PhMe-D dp>2 (e.g., dp>10; dp>50; dp>100; dp>150; or dp from about 2 to about 150; dp from about 50 to about 150; or dp from about 70 to about 150); and/or $Ph_2$-D/$Me_2$-D>20 mole % (e.g., >30 mole %; >40 mole %; >50 mole %; or from about 20 to about 50 mole %; about 30 to about 50 mole %; or from about 20 to about 30 mole %), where the mole ratio of $Ph_2$-D/$Me_2$-D is about 3/7. In some embodiments, the $Ph_2$-D/$Me_2$-D mole ratio is from about 1/4 to about 1/2, e.g., about 3/7 to about 3/8. In still other embodiments, the organosiloxane block copolymer includes one or more hard blocks (e.g., blocks with glass transition>25° C.) and one or more linear or resinous siloxanes, for example, phenyl silsesquioxane resins, which may be used to form non-tacky films.

In some embodiments, the solid compositions, which include a resin-linear organosiloxane block copolymer, also contain a superbase catalyst. See, e.g., PCT Appl. No. PCT/US2012/069701, filed Dec. 14, 2012; and U.S. Provisional Appl. No. 61/570,477, filed Dec. 14, 2012, the entireties of which are incorporated by reference as if fully set forth herein. The term "superbase" and "superbase catalyst" are used herein interchangeably. In some embodiments, solid compositions comprising a superbase catalyst exhibit enhanced cure rates, improved mechanical strength, and improved thermal stability over similar compositions without the superbase catalyst.

The term "superbase" is used herein refers to compounds having a very high basicity, such as lithium diisopropylamide. The term "superbase" also encompasses bases resulting from a mixing of two (or more) bases leading to new basic species possessing inherent new properties. The term "superbase" does not necessarily mean a base that is thermodynamically and/or kinetically stronger than another. Instead, in some embodiments, it means that a basic reagent is created by combining the characteristics of several different bases. The term "superbase" also encompasses any species with a higher absolute proton affinity (APA=245.3 kcal/mole) and intrinsic gas phase basicity (GB=239 kcal/mole) relative to 1,8-bis-(dimethylamino)-naphthalene.

Non-limiting examples of superbases include organic superbases, organometallic superbases, and inorganic superbases.

Organic superbases include, but are not limited to nitrogen-containing compounds. In some embodiments, the nitrogen-containing compounds also have low nucleophilicity and relatively mild conditions of use. Non-limiting examples of nitrogen-containing compounds include phosphazenes, amidines, guanidines, and multicyclic polyamines. Organic superbases also include compounds where a reactive metal has been exchanged for a hydrogen on a heteroatom, such as oxygen (unstabilized alkoxides) or nitrogen (metal amides such as lithium diisopropylamide). In some embodiments, the superbase catalyst is an amidine compound.

In some embodiments, the term "superbase" refers to organic superbases having at least two nitrogen atoms and a $pK_b$ of from about 0.5 to about 11, as measured in water. For example, the $pK_b$ is from about 0.5 to about 10, from about 1 to about 5, from about 6 to about 11, from about 3 to about 5, from about 0.5 to about 3 or from about 2 to about 5, as measured in water. In terms of $pK_a$, in some embodiments, superbases have a $pK_a$ of from about 3 to about 13.5, as measured in water. For example, the $pK_a$ is from about 5 to about 10, from about 5 to about 10, from about 8 to about 13.5, from about 6 to about 8, from about 10 to about 12 or from about 9 to about 12, as measured in water. For example, 1,4-diazabicyclo[2.2.2]octane, also known as DABCO, has a $pK_a$ of 2.97 and 8.82 (since it contains two nitrogens); and 1,8-diazabicyclo[5.4.0]undec-7-ene, also known as DBU, has a $pK_a$ of about 12. See, e.g., http://evans.harvard.edu/pdf/evans_pka_table.pdf.

Organometallic superbases include, but are not limited to, organolithium and organomagnesium (Grignard reagent) compounds. In some embodiments, the organometallic superbases are hindered to the extent necessary to make them non-nucleophilic.

Superbases also include mixtures of organic, organometallic, and/or inorganic superbases. A non-limited example of such mixed superbases is the Schlosser base (or Lochmann-Schlosser base), which is the combination of n-butyllithium and potassium tert-butoxide. The combination of n-butyllithium and potassium tert-butoxide form a mixed aggregate of greater reactivity than either reagent alone and with distinctly different properties in comparison to tert-butylpotassium.

Inorganic superbases include salt-like compounds with small, highly charged anions. Non-limiting examples of inorganic superbases include lithium nitride and alkali- and alkali earth metal hydrides including potassium hydride and sodium hydride. Such species are insoluble in all solvents owing to the strong cation-anion interactions, but the surfaces of these materials are highly reactive and slurries can be used.

In certain embodiments of the present invention, the superbase catalyst is an organic superbase, such as any of the organic superbases as described above or known in the art.

In a further embodiment, the superbase catalyst comprises:

1,8-Diazabicyclo[5.4.0]undec-7-ene (DBU), (CAS #6674-22-2)

1,5,7-Triazabicyclo[4.4.0]dec-5-ene (TBD), (CAS #5807-14-7)

1,4-Diazabicyclo[2.2.2]octane (DABCO), (CAS #280-57-9)

1,1,3,3-Tetramethylguanidine (TMG), (CAS #80-70-6)

1,5-Diazabicyclo[4.3.0]-5-nonene (DBN), (CAS #3001-72-7)

7-Methyl-1,5,7-triazabicyclo[4.4.0]dec-5-ene (MTBD) (CAS #84030-20-6)

or combinations thereof.

The structures for each of these are shown below:

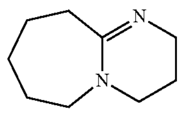 [SMILES: C1CCC2=NCCCN2CC1]

DBU

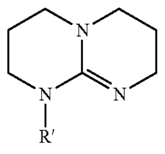

TBD (when R' = H)
MTBD (when R' = $CH_3$)

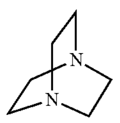

DABCO

-continued

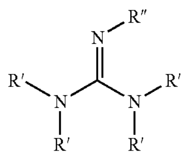

TMG (when R' = $CH_3$ and R" = H)

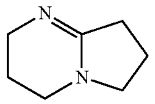

DBN

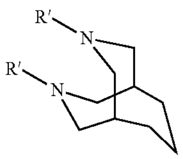

Bispidine (when R' = H)

where each R' is the same or different and is hydrogen or $C_1$-$C_5$ alkyl; and R" is hydrogen or $C_1$-$C_5$ alkyl. As used herein, the term "$C_1$-$C_5$ alkyl" refers broadly to a straight or branched chain saturated hydrocarbon radical. Examples of alkyl groups include, but are not limited to, straight chained alkyl groups including methyl, ethyl, n-propyl, n-butyl; and branched alkyl groups including isopropyl, tert-butyl, iso-amyl, neopentyl, and the like. In some embodiments, the hydrocarbon radical is methyl.

The amount of the superbase catalyst in the solid compositions may vary and is not limiting. Typically, the amount added is a catalytically effective amount, which may vary depending on the superbase selected, as well as the concentration of residual silanol groups in the linear-resin copolymer composition, especially the amount of residual silanol groups on the resin components, and particularly the silanol amount on the "free resin" components in the composition. The amount of superbase catalyst is typically measured in parts per million (ppm) in the solid composition. In particular, the catalyst level is calculated in regard to copolymer solids. The amount of superbase catalyst added to the curable compositions may range from 0.1 to 1,000 ppm, alternatively from 1 to 500 ppm, or alternatively from 10 to 100 ppm, as based on the resin-linear block copolymer content (by weight) present in the solid compositions. For convenience for measuring and adding to the present compositions, the superbase catalyst may be diluted in an organic solvent before adding to the solid compositions. Typically, the superbase in diluted in the same organic solvent as used in the curable compositions.

In some embodiments, the superbase, in its broadest sense, may be considered a silanol condensation enhancing agent and may act as a condensation catalyst. In some embodiments, the silanol condensation enhancing agent may substantially reside in the phase separated resin rich phase and enhances silanol condensation in that phase, thereby reducing the mole % of reactive silanol groups in that phase. While not wishing to be bound by theory, it is believed that the superbase is thought to interact very strongly with acidic SiOH groups of the resin residing in the phase separated resin rich phase. In some embodiments, the silanol condensation enhancing agent will be more likely to reside in the phase separated resin rich phase when the silanol condensation enhancing agent is more compatible (e.g., soluble) with that phase than, e.g., in the organosiloxane block copolymer-rich phase, and less likely to reside in the phase separated resin rich phase when the silanol condensation enhancing agent is less compatible with phase separated resin rich phase. In some embodiments, the mole % of reactive silanol groups in the phase separated resin rich phase is reduced by about 25%, e.g., by about 35%, by about 45%, by about 55%, by about 65%, by about 75%, by about 85%, or by about 95% relative to the mole % reactive silanol groups that would be present in the phase separated resin rich phase if the superbase were not present. In some embodiments, the mole % of reactive silanol groups in the phase separated resin rich phase is reduced from about 25% to about 95%, e.g., from about 25% to about 55%, from about 25% to about 75%, from about 35% to about 75%, from about 55% to about 95% or from about 55% to about 85% relative to the mole % reactive silanol groups that would be present in the phase separated resin rich phase if the superbase were not present.

In some embodiments, the solid compositions, which include a resin-linear organosiloxane block copolymer, also contain a stabilizer. See, e.g., PCT Appl. No. PCT/US2012/067334, filed Nov. 30, 2012; and U.S. Provisional Appl. No. 61/566,031, filed Dec. 2, 2011, the entireties of which are incorporated by reference as if fully set forth herein. A stabilizer is added to the resin-linear organosiloxane block copolymers, as described above, to improve shelf stability and/or other physical properties of solid compositions containing the organosiloxane block copolymers. The stabilizer may be selected from an alkaline earth metal salt, a metal chelate, a boron compound, a silicon-containing small molecule or combinations thereof.

Although not wishing to be bound by any theory, the stabilizer component may behave as a condensation catalyst. For example, treatment with a salt such as calcium chloride or catalysts like metal chelates (e.g., magnesium acetylacetonate or $Al(acac)_3$) during the synthesis (e.g., at the end of synthesis) of the resin-linear organosiloxane block copolymers of some of the embodiments described herein, greatly increases the stability of the product. This is surprising and unexpected, since catalysts would be expected to reduce shelf stability of the silanol functional copolymers. However, while not being bound by theory, it is believed that, in some cases, the stabilizers may be preferentially soluble in the phase separated resin-rich phase and enhance condensation of the silanol groups present in this phase. Since this phase (i.e., the resin-rich phase) mainly contains residual "free resin", condensation of this phase can subsequently increase the cure temperature of the matrix containing the resin-linear block copolymers. For example, in the absence of the stabilizers of some of the embodiments described herein, a typical resin-linear material with elastomeric behavior (e.g., based on 20 mole % Phenyl-silsesquioxane resin and 184 dp polydimethylsiloxane, also known as "PDMS"), will have a flow onset around 80° C. followed by further condensation cure around 120° C. from residual silanol groups residing on the resin blocks, resulting in a material with tensile strength from 2-5 MPa and elongation at break from 200-600%. The same resin-linear material comprising a stabilizer will have its cure temperature significantly extended from 120 to 180° C.

In sum, in some embodiments, the stabilizer, in its broadest sense, may be considered a silanol condensation enhancing agent (i.e., a condensation catalyst). In some embodiments, the silanol condensation enhancing agent may substantially reside in the phase separated resin rich phase and enhances silanol condensation in that phase, thereby reducing the mole % of reactive silanol groups in that phase. In some embodiments, the silanol condensation enhancing agent will be more likely to reside in the phase separated resin rich phase when the silanol condensation enhancing agent is more compatible (e.g., soluble) with that phase than, e.g., in the organosiloxane block copolymer-rich phase, and less likely to reside in the phase separated resin rich phase when the silanol condensation enhancing agent is less compatible with phase separated resin rich phase. In some embodiments, the mole % of reactive silanol groups in the phase separated resin rich phase is reduced by about 25%, e.g., by about 35%, by about 45%, by about 55%, by about 65%, by about 75%, by about 85%, or by about 95% relative to the mole % reactive silanol groups that would be present in the phase separated resin rich phase if the stabilizer were not present. In some embodiments, the mole % of reactive silanol groups in the phase separated resin rich phase is reduced from about 25% to about 95%, e.g., from about 25% to about 55%, from about 25% to about 75%, from about 35% to about 75%, from about 55% to about 95% or from about 55% to about 85% relative to the mole % reactive silanol groups that would be present in the phase separated resin rich phase if the stabilizer were not present.

The stabilizer ii) is combined with the organosiloxane block copolymer i) as described above. The method by which they are combined may vary and is not limiting, but typically the stabilizer is added to the resin-linear organosiloxane block copolymer or a composition containing the block copolymer. Alternatively, curable compositions containing the two components may be prepared by the methods described further below.

In one embodiment, the stabilizer comprises an alkaline earth metal salt. As used herein the term "alkaline earth metal salt" includes, but is not limited to, salts of magnesium and calcium. Non-limiting examples of salts of magnesium include magnesium chloride. Non-limiting examples of salts of calcium include calcium chloride. For example, calcium chloride enhances the stability of organic solutions of resin-linear organosiloxane block copolymers. The enhanced stability associated with alkaline earth metal salt, as well as or the other stabilizers disclosed herein, may be assessed by monitoring the time needed to gel a solution of the resin-linear organosiloxane block copolymer at slightly elevated temperatures (such as 40° C., see examples for further details). The amount of the alkaline earth metal salt combined with the resin-linear organosiloxane block copolymer may vary, but typically, 1 to 100, alternatively 5 to 50, or alternatively 10 to 25 parts by weight of the alkaline earth metal salt is added for every 100 parts by weight of the resin-linear organosiloxane block copolymer of some of the embodiments described herein.

In another embodiment, the stabilizer comprises a metal chelate such as a metal acetylacetonate (acac). Representative metal acetylacetonate complexes suitable as a stabilizer include, but are not limited to, aluminum, lithium, vanadium, nickel, zirconium, manganese, calcium, and magnesium acetylacetonate complexes. The amount of the metal chelate combined with the resin-linear organosiloxane block copolymer may vary, but typically the amounts are selected based on providing a certain metal concentration in the compositions containing the resin-linear organosiloxane block copolymer. The metal concentrations in the compositions may be expressed in parts per million (ppm). Typically the metal concentrations in the compositions containing the resin-linear organosiloxane block copolymer varies from 1 to 1000 ppm, alternatively 10 to 500 ppm, 100 to 400 ppm, 50 to 300 ppm, 50 to 250 ppm, 50 to 100 ppm, 100 to 250 ppm, 150 to 250 ppm, 150 to 200 ppm or alternatively from 200 to 300 ppm.

In other embodiments, the stabilizer comprises a boron compound. In some embodiments, the boron compound comprises a derivative of boric acid (i.e., derivatives of $B(OH)_3$), compounds that contain B—OH units, or any boron compounds known to affect silanol condensation reactions (e.g., boron nitride and boron oxide). In one embodiment, the stabilizer is a boric acid derivative. Boric acid derivatives include, but are not limited to boronic acids including isobuteneboronic acid, (2-methylpropyl)boronic acid, phenyl boronic acid, $(C_6H_5)B(OH)_2$, and any other boronic acid comprising an aromatic group, including 4-formylphenyl boronic acid, 2-hydroxy-3-methylphenyl boronic acid, (2,6-dimethoxy-4-methylphenyl)boronic acid, (2-fluoro-5-methoxycarbonylphenyl)boronic acid, (3-chloro-2-methylphenyl)boronic acid, (3-ethoxy-5-fluorophenyl)boronic acid, (3-fluoro-5-ethoxycarbonylphenyl)boronic acid, (3-fluoro-5-isopropoxyphenyl)boronic acid, (3-fluoro-5-methoxycarbonylphenyl)boronic acid, (3-fluoro-5-methylphenyl)boronic acid, (3-methoxy-5-(trifluoromethyl)phenyl)boronic acid, (3-t-butyl-5-methylphenyl)boronic acid, (4-bromo-2,5-dimethylphenyl)boronic acid, (4-fluoro-3-methoxyphenyl)boronic acid, (4-methoxy-3-trifluoromethylphenyl)boronic acid, and the like. See, e.g., http://www.sigmaaldrich.com/chemistry/special-offers/boronic-acid.html?cm_sp=Insite-_-ChemSynth-_-BoronicAcidPromo for additional other boronic acid comprising an aromatic group.

The amount of boric acid derivative, compounds that contain B—OH units, or the amount of boron compound known to affect silanol condensation reactions may vary, but typically the amount selected is based on the mole ratio of the OH groups of the boric acid derivative, compounds that contain B—OH units, or the amount of boron compound known to affect silanol condensation reactions to the Si—OZ content (amount of Si—OH or Si-alkoxy) on the resin components of the resin-linear organosiloxane block copolymer compositions. Typically the mole ratio of the OH groups of boric acid derivative, compounds that contain B—OH units, or the amount of boron compound known to affect silanol condensation reactions to the Si—OZ content of the resin-linear organosiloxane block copolymers is 0.1/50, alternatively 0.5/20, or alternatively 1/10. In some embodiments, the mole ratio of the OH groups of boric acid derivative, compounds that contain B—OH units, or the amount of boron compound known to affect silanol condensation reactions to the Si—OZ content of the resin-linear organosiloxane block copolymers is 0.1/50 to 1/10, e.g., from 0.1/50 to 0.5/20, from 0.5/20 to 1/10 or from 0.5/20 to 5/20. In some embodiments, the boric acid derivative comprises phenyl boronic acid.

In some embodiments, the stabilizer comprises a silicon-containing small molecule. As used herein, the term "silicon-containing small molecule" includes, but is not limited to compounds of the formula:

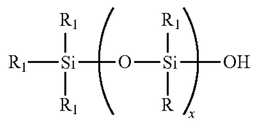

wherein each $R_1$ is the same or different and may be a $C_1$-$C_{30}$ hydrocarbyl group, as the group is defined previously. Non-limiting examples of such silicon-containing small molecules include $Ph_2MeSiOH$ and $Ph_3SiOH$.

The term "silicon-containing small molecule" also includes silanes of the formula:

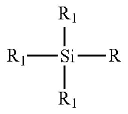

wherein each $R_1$ is the same or different and may be a $C_1$-$C_{30}$ hydrocarbyl group, as the group is defined previously; and R is $R_1$ or hydrogen. Non-limiting examples of such silanes include, but are not limited to triphenyl silane ($Ph_3SiH$) and tetraphenyl silane ($Ph_4Si$).

As used herein, the term "small molecule" refers to molecules not exceeding 1000 g/mole.

In some embodiments, the silicon-containing small molecule stabilizer is used in combination with one or more other stabilizers. For example, the silicon-containing small molecule could be used in combination with an alkaline earth metal salt, a metal chelate or a boron compound. In some embodiments, the silicon-containing small molecule is used in combination with a metal chelate (e.g., $Al(acac)_3$). In some embodiments, the silicon-containing small molecule stabilizer is added during the preparation/synthesis of the block copolymers of some of the embodiments described herein. In other embodiments, the silicon-containing small molecule stabilizer is added after the block copolymers of some of the embodiments described herein have been prepared/synthesized.

In some embodiments, the amount of the silicon-containing small molecule that may be used is less than 15 wt %, e.g., less than 10 wt %, less than 5 wt %, less than 2 wt %, less than 1 wt % or less than 0.5 wt %. In some embodiments, the amount of the silicon-containing small molecule that me be used is from about 0.1 wt % to about 10 wt %, e.g., from about 0.1 wt % to about 0.5 wt %, from about 0.25 wt % to about 1 wt %, from about 1 wt % to about 5 wt %, from about 2 wt % to about 10 wt % or from about 2 wt % to about 5 wt %.

Non-Limiting Physical Properties of the Solid Composition:

The physical properties of the solid composition of some of the embodiments described herein are not limited. In some embodiments, the solid composition has a viscosity greater than 100 cSt at 120° C. or greater than 1000 cSt at 120° C., greater than 5000 cSt at 120° C. or greater than 10,000 cSt at 120° C., and, in some instances, may have an infinite viscosity. In some embodiments, the solid composition has a viscosity of from about 100 cSt to about 10,000 cSt at 120° C.; e.g., from about 1000 cSt to about 5000 cSt at 120° C.; from about 500 cSt to about 2000 cSt at 120° C.; from about 2000 cSt to about 5000 cSt or from about 5000 cSt to about 10,000 cSt at 120° C.

In some embodiments, the solid composition has a refractive index greater than 1.4 and may have a refractive index greater than 1.44, 1.5, 1.54, or alternatively greater than 1.55, as determined using ASTM D542. In some embodiments, the solid composition has a refractive index greater than 2.5. In other embodiments, the solid composition has a refractive index of from about 1.4 to about 2.5, e.g., from about 1.5 to about 2.5; from about 1.7 to about 2.4; from about 1.4 to about 1.7; or from about 1.9 to about 2.3.

In other embodiments, the solid composition has greater than 50, 55, 60, 65, 70, 75, 80, 85, 90, 95, 96, 97, 98, or 99, or about 100% light transmittance. The light transmittance is typically determined using ASTM E-903-96 or a modified version of ASTM D1003, which specifies how to measure light transmittance using a class C light source. In the modified version, the class C light source is replaced with a light source that produces the solar spectrum (i.e., the AM 1.5 G spectrum). Spectral transmittance values are also independent of reflective losses in the modified method in contrast to ASTM D1003. Measurements are acquired using a Varian Cary 5000 between 200-1700 nm.

In some embodiments, the solid composition of some of the embodiments described herein has one or more, in some cases all, of the following characteristics: resists yellowing; resists light absorption losses; has increased toughness; has excellent thermal stability; exhibits excellent flexibility in processing (e.g., B-staged films can be pre-cured, but can re-flow after curing); and/or exhibits adhesion to numerous types of surfaces, in some cases, without a need for adhesion promoters. In addition, the solid composition of some of the embodiments described herein can maintain its refractive index even when its mechanical properties are manipulated and customized. Moreover, PDMS resin-linears may be utilized wherein the linear and the resin block have refractive indices that are dissimilar (e.g. RI $Me_2$-D=1.41 and RI Ph-T=1.56). Furthermore, the solid composition can be tailored to have a (high) refractive index which may be matched or similar to a refractive index of a superstrate such as front glass, which increases efficiency. Moreover, the solid composition, in some embodiments, offers excellent melt flowability simultaneously with shelf stability.

The solid compositions may be further characterized by certain physical properties such as tensile strength and % elongation at break. The present solid compositions derived from the aforementioned organosiloxane block copolymers may have an initial tensile strength greater than 1.0 MPa, alternatively greater than 1.5 MPa, or alternatively greater than 2 MPa. In some embodiments, the solid compositions may have an initial tensile strength from 1.0 MPa to about 10 MPa, e.g., from about 1.5 MPa to about 10 MPa, from about 2 MPa to about 10 MPa, from about 5 MPa to about 10 MPa or from about 7 MPa to about 10 MPa. The present solid compositions derived from the aforementioned organosiloxane block copolymers may have an initial % elongation at break (or rupture) greater than 40%, alternatively greater than 50%, or alternatively greater than 75%. In some embodiments, the solid compositions may have a % elongation at break (or rupture) of from about 20% to about 90%, e.g., from about 25% to about 50%, from about 20% to about 60%, from about 40% to about 60%, from about 40% to about 50%, or from about 75% to about 90%. As used herein, tensile strength and % elongation at break are measured according to ASTM D412.

In some embodiments, the solid composition of the embodiments of the present invention retain certain physical properties such as tensile strength and % elongation at break, upon heat aging. In one embodiment, the tensile strength of the solid composition remains within 20%, alternatively within 10%, or alternatively within 5% of its original value upon heat aging at 200° C. for 1000 hours. In some embodiments, the tensile strength of the solid composition remains within from about 20% to about 1% of its original value, e.g., from about 10% to about 1%, from about 10% to about 5% or from about 5% to about 1% of its original value upon heat aging at 200° C. for 1000 hours. In some embodiments, heat aging may be conducted by heating samples within an air circulating oven at elevated temperatures and for an extended period of time (e.g., about 150-300° C. for about 50 to about 10,000 hours). In some embodiments, the tensile strength of the solid composition remains within about 1% or remains the same as its original value upon heat aging at 200° C. for 1000 hours. In other embodiments, the % elongation at break is at least 10%, alternatively 50%, or alternatively 75% upon heat aging at 200° C. for 1000 hours. In some embodiments, the % elongation at break is from about 10% to about 90%, e.g., from about 10% to about 50%, from about 25% to about 60%, from about 40% to about 60% or from about 50% to about 75% upon heat aging at 200° C. for 1000 hours.

In one embodiment, the solid compositions of the organosiloxane block copolymers may be considered as "melt processable". In this embodiment, the solid compositions, such as a coating formed from a film of a solution containing the organosiloxane block copolymers, exhibit fluid behavior at elevated temperatures, that is upon "melting". The "melt processable" features of the solid compositions of the organosiloxane block copolymers may be monitored by measuring the "melt flow temperature" of the solid compositions, that is when the solid composition demonstrates liquid behavior. The melt flow temperature may specifically be determined by measuring the storage modulus (G'), loss modulus (G") and tan delta as a function of temperature storage using commercially available instruments. For example, a commercial rheometer (such as TA Instruments' ARES-RDA—with 2KSTD standard flexular pivot spring transducer, with forced convection oven) may be used to measure the storage modulus (G'), loss modulus (G") and tan delta as a function of temperature. Test specimens (typically 8 mm wide, 1 mm thick) may be loaded in between parallel plates and measured using small strain oscillatory rheology while ramping the temperature in a range from 25° C. to 300° C. at 2° C./min (frequency 1 Hz). The flow onset may be calculated as the inflection temperature in the G' drop (labeled FLOW), the viscosity at 120° C. is reported as a measure for melt processability and the cure onset is calculated as the onset temperature in the G' rise (labeled CURE). Typically, the FLOW of the solid compositions will also correlate to the glass transition temperature of the non-linear segments (i.e., the resin component) in the organosiloxane block copolymer.

In some embodiments, the tan delta=1 is from about 3 to about 5 hours at 150° C., e.g., from about 3 to about 5 minutes at 150° C., from about 10 to about 15 minutes at 150° C., from about 10 to about 12 minutes at 150° C., from about 8 to about 10 minutes at 150° C., from about 30 minutes to about 2.5 hours at 150° C., from about 1 hour to about 4 hours at 150° C. or from about 2.5 hours to about 5 hours at 150° C. In other embodiments, e.g., when a superbase is used, the tan delta=1 is from about 3 to about 60 seconds at 150° C., e.g., from about 3 to about 30 seconds at 150° C., from about 10 to about 45 seconds at 150° C., from about 5 to about 50 seconds at 150° C., from about 10 to about 30 seconds at 150° C. or from about 30 seconds to about 60 seconds at 150° C. In still other embodiments, e.g., when a superbase is used, the tan delta=1 is from about 5 to about 1200 seconds at 120° C., e.g., from about 20 to about 60 seconds at 120° C., from about 20 to about 600 seconds at 120° C., from about 60 to about 1200 seconds at 120° C., from about 5 to about 100 seconds at 120° C., from about 10 to about 60 seconds at 120° C. or from about 30 seconds to about 60 seconds at 120° C.

In a further embodiment, the solid compositions may be characterized as having a melt flow temperature ranging from 25° C. to 200° C., alternatively from 25° C. to 160° C., or alternatively from 50° C. to 160° C.

It is believed that the melt processability benefits enables the reflow of solid compositions of the organosiloxane block copolymers around device architectures at temperatures below $T_{cure}$, after an initial coating or solid is formed on the device. This feature is very beneficial to encapsulated various electronic devices.

In one embodiment, the solid compositions of the organosiloxane block copolymers may be considered as "curable". In this embodiment, the solid compositions, such as a coating formed from a film of a solution containing the organosiloxane block copolymers, may undergo further physical property changes by further curing the block copolymer. As discussed above, the present organosiloxane block copolymers contain a certain amount of silanol groups. It is believed that the presence of these silanol groups on the block copolymer permit further reactivity, i.e., a cure mechanism. Upon curing, the physical properties of solid compositions may be further altered, as discussed in certain embodiments below.

Alternatively, the "melt processability" and/or cure of the solid compositions of the organosiloxane block copolymers may be determined by rheological measurements at various temperatures.

The solid compositions containing the organosiloxane block copolymers may have a storage modulus (G') at 25° C. ranging from 0.01 MPa to 500 MPa and a loss modulus (G") ranging from 0.001 MPa to 250 MPa, alternatively a storage modulus (G') at 25° C. ranging from 0.1 MPa to 250 MPa and a loss modulus (G") ranging from 0.01 MPa to 125 MPa, alternatively a storage modulus (G') at 25° C. ranging from 0.1 MPa to 200 MPa and a loss modulus (G") ranging from 0.01 MPa to 100 MPa.

The solid compositions containing the organosiloxane block copolymers may have a storage modulus (G') at 120° C. ranging from 10 Pa to 500,000 Pa and a loss modulus (G") ranging from 10 Pa to 500,000 Pa, alternatively a storage modulus (G') at 120° C. ranging from 20 Pa to 250,000 Pa and a loss modulus (G") ranging from 20 Pa to 250,000 Pa, alternatively a storage modulus (G') at 120° C. ranging from 30 Pa to 200,000 Pa and a loss modulus (G") ranging from 30 Pa to 200,000 Pa.

The solid compositions containing the organosiloxane block copolymers may have a storage modulus (G') at 200° C. ranging from 10 Pa to 100,000 Pa and a loss modulus (G") ranging from 5 Pa to 80,000 Pa, alternatively a storage modulus (G') at 200° C. ranging from 20 Pa to 75,000 Pa and a loss modulus (G") ranging from 10 Pa to 65,000 Pa, alternatively a storage modulus (G') at 200° C. ranging from 30 Pa to 50,000 Pa and a loss modulus (G") ranging from 15 Pa to 40,000 Pa.

The structural ordering of the disiloxy and trisiloxy units in the organosiloxane block copolymer as described above may provide the organosiloxane block copolymer with certain unique physical property characteristics when the solid composition are formed. For example, the structural ordering of the disiloxy and trisiloxy units in the copolymer may provide solid composition that allow for a high optical transmittance of visible light. The structural ordering may also allow the organosiloxane block copolymer to flow and cure upon heating, yet remain stable at room temperature. The siloxy units may also be processed using lamination techniques. These properties may be useful to provide coatings for various electronic articles to improve weather resistance and durability, while providing low cost and easy procedures that are energy efficient.

Referring back to the method step of applying the composition on the surface, the step of applying may be further defined as placing the solid composition on the surface. The solid composition may be placed on the surface using any mechanism known in the art. For example, pellets of the solid composition may be poured onto the surface. Alternatively, a roll of the solid composition may be unrolled onto the surface. Sheets of the solid composition may be placed onto the surface.

The surface is not particularly limited and may be further defined as a surface of a mold, the surface of a platen, or the surface of a base or support, e.g., the surface of a lamination or vacuum device. The surface is typically flat or planar but may be curved or have flat portions and curved portions. The surface may be heated or unheated.

In various embodiments, the surface is shaped such that the composition, after flowing, takes the shape of the desired final product. For example, the surface may include bumps, mounds, or ridges, such that the final product is formed in the same of a dome or lens and/or can be used in arrays of LED chips, in semiconductor arrays, etc. Alternatively, the surface may include indentations or concave sections or holes such that the final product can be used in LED chassis arrays, light guide wave plates, etc.

The method may also include the step of disposing a release liner on the surface prior to the step of applying the composition on the surface. The release liner is not particularly limited and may be known in the art. Suitable, but non-limiting, examples include PET liners, Teflon liners, and the like. The release liner may be disposed, or applied, to the surface in the same or in a different way as the solid composition.

The method also includes the step of heating the composition to a temperature at or above the glass transition temperature such that the composition flows. Typically, in this step, the glass transition temperature is further described as the second (or higher) glass transition temperature of the solid composition. In other words, the step of heating the composition is typically further defined as heating to a temperature at or above the second (or higher) glass transition temperature of the solid composition such that the solid composition flows. However, it is contemplated that the glass transition temperature described in this step is the first (or lower) glass transition temperature of the solid composition. If the solid composition has only one glass transition temperature, then this step describes heating to a temperature at or above that single glass transition temperature. If the solid composition has three or more glass transition temperatures, then the step of heating may be heating to a temperature at or above any one or more of the multiple glass transition temperatures. Typically, the composition flows onto, or wets, the surface or a portion of the surface upon flowing. As is well known in the art, the terminology "flows" may describe a softening of the composition or liquefaction of the composition. The solid composition may flow into a mold or onto a platen.

The step of heating is not particularly limited and may include direct or indirect heating. The heating may be accomplished using any method known in the art including, but not limited to, heating using solids, liquids, or gasses, heating using heated plates or platen, heating using electrical mechanisms, and the like. In one embodiment, the step of heating includes heating in a mold. In another embodiment, the step of heating includes heating in a press. In various embodiments, the step of heating is further defined as compression molding, injection (transfer) molding, calendaring, embossing, (vacuum), etc.

The method further includes the step of cooling the composition, after the step of heating, to form the light transmitting sheet. The step of cooling is also not particularly limited. The step of cooling may include using a solid, liquid, or a gas to cool the solid composition. The solid composition may be cooled simply by exposure to the atmosphere or may be cooled using an active step. Typically, the heated composition that flows is cooled (such that it no longer flows) and thereby solidifies or hardens to form the light transmitting sheet. After the step of cooling the composition, the method may include the step of removing the light transmitting sheet from the surface, e.g., removing from a compression molding machine or from a laminator, etc.

The method may also include the step of curing the solid composition via a condensation reaction or a free-radical reaction. The step of curing may occur at a temperature lower than, approximately equal to, or higher than, any one or more of the glass transition temperatures of the solid composition. In one embodiment, the method includes the step of curing the solid composition on the surface, e.g., in a mold and/or on one, or between two, platen.

FIGS. 3A-3D illustrate a process by which a light transmitting sheet may be utilized for form multiple optical assemblies. While the optical assembly discussed herein is optical assembly 100, alternative optical assemblies may be utilized.

Figure 3A:
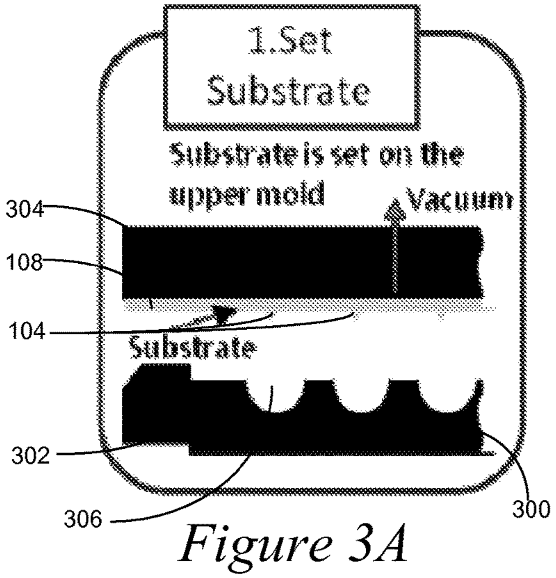
FIGS. 3A-3D illustrate a process for making an optical assembly.

In FIG. 3A, a mold 300 for forming an optical assembly 100 includes a first member 302 and a second member 304. The first member 302 and second member 304, when clamped and/or secured with respect to one another, form a cavity 306 in which the optical assembly 100 is formed. As illustrated, the first member 302 and the second member 304 form a cavity 306 configured to form the light transmitting sheet of the encapsulant 102 into the form of a lens. A substrate 108 with attached optical devices 104 can be positioned with respect to the second member 304 and secured in place, such as with a vacuum.

Figure 3B:
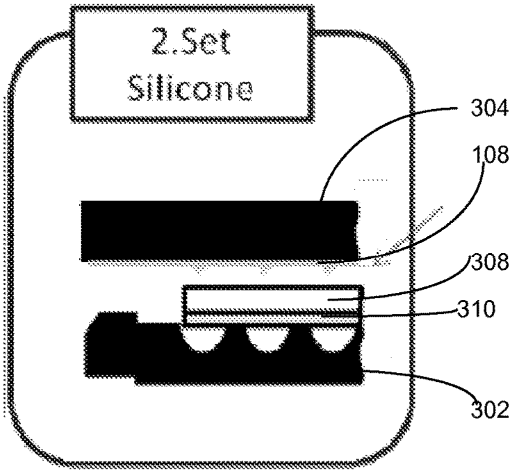

In FIG. 3B, a light transmitting sheet 308 and a release liner 310 are positioned between the first member 302 and the second member 304, with the release liner 310 generally proximate the first member 302 and the light transmitting sheet 308 between the release liner 310 and the substrate 108.

Figure 3C:
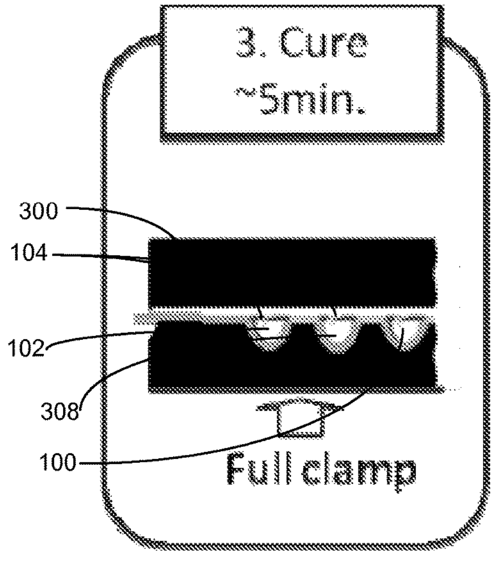

In FIG. 3C, the mold 300 is clamped, thereby forming the light transmitting sheet 308 into the encapsulant 102 in the form of the lens. It is emphasized that the encapsulant 102 may still be understood to be the light transmitting sheet 308, with the term encapsulant 102 reflecting that the light transmitting sheet 308 now encapsulates the optical devices 104 to form the optical assembly 100. The resultant optical assemblies 100 may be cured as disclosed herein, such as for approximately five (5) minutes.

Figure 3D:
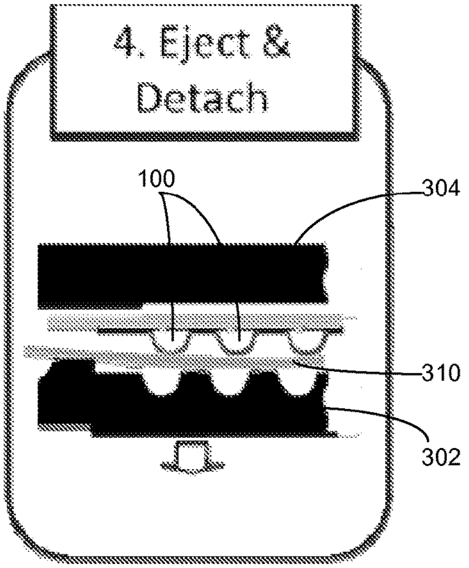

In FIG. 3D, the first member 302 and the second member 304 are detached to release the optical assemblies 100. The release liner 310 may promote the ejection of the optical assemblies 100 from the mold 300. The release liner 310 detaches from the optical assemblies 100. The optical assemblies 100 may be separated with respect to one another by various methods.

FIGS. 4A-4E illustrate a process by which a light transmitting sheet may be utilized for form multiple optical assemblies. While the optical assembly discussed herein is optical assembly 100, alternative optical assemblies may be utilized. Further, while the mold discussed herein is the mold 300, alternative molds may be utilized.

Figure 4A:
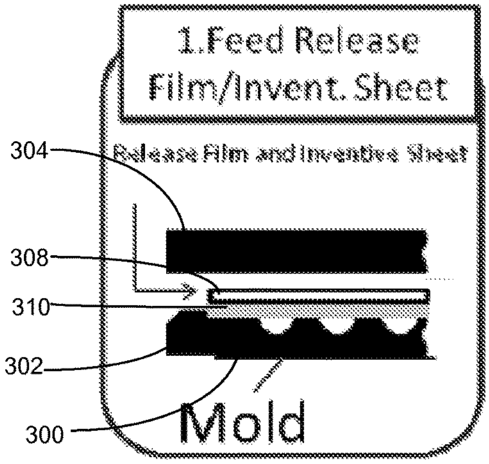
FIGS. 4A-4E illustrate a process for making an optical assembly.

In FIG. 4A, a light transmitting sheet 308 and a release liner 310 are positioned between the first member 302 and the second member 304 of the mold 300, with the release liner 310 generally proximate the first member 302 and the light transmitting sheet 308 generally proximate the second member 304.

Figure 4B:
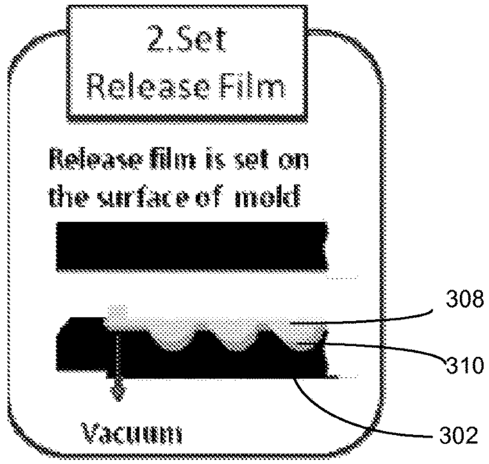

In FIG. 4B, the release liner 310 is set on the first member 302. In various examples, the release liner 310 is set using vacuum suction. In various examples, setting the release liner 310 also sets the light transmitting sheet 308, such as in the form of lenses for use in the optical assemblies 100.

Figure 4C:
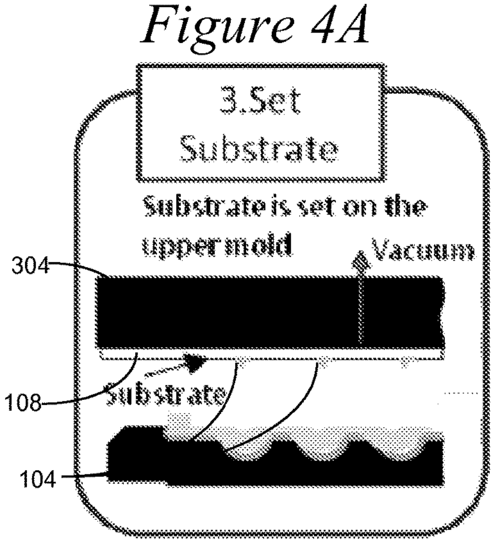

In FIG. 4C, the substrate 108 with attached optical devices 104 is positioned with respect to the second member 304 and secured in place, such as with a vacuum.

Figure 4D:
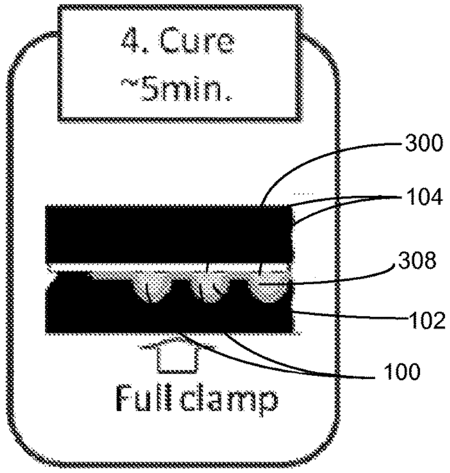

In FIG. 4D, the mold 300 is clamped, thereby securing the light transmitting sheet 308 as the encapsulant 102 with respect to the optical device 104. The resultant optical assemblies 100 may be cured as disclosed herein, such as for approximately five (5) minutes.

Figure 4E:
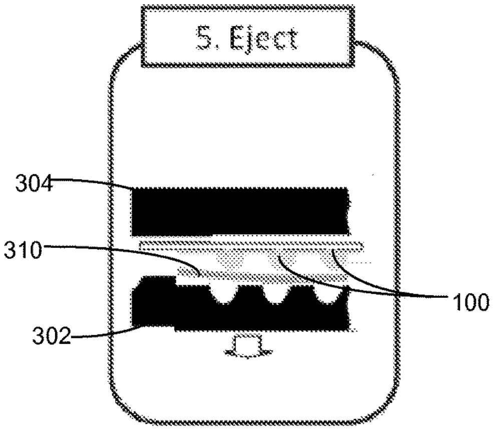

In FIG. 4E, the first member 302 and the second member 304 are detached to release the optical assemblies 100. The release liner 310 may promote the ejection of the optical assemblies 100 from the mold 300. The release liner 310 detaches from the optical assemblies 100. The optical assemblies 100 may be separated with respect to one another by various methods.

FIGS. 5A-5E illustrate a process by which a light transmitting sheet may be utilized for multiple optical assemblies. While the optical assembly discussed herein is optical assembly 100, alternative optical assemblies may be utilized.

Figure 5A:
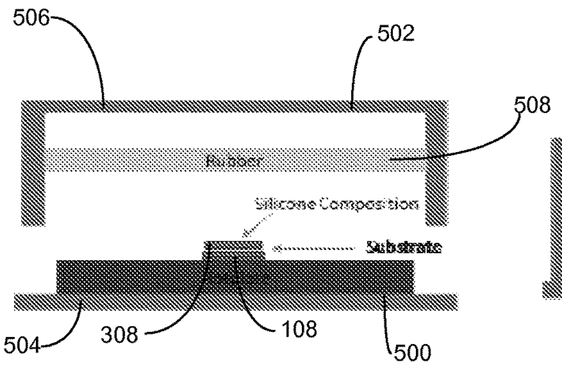
FIGS. 5A-5E is a process schematic of still another embodiment of the present disclosure.

In FIG. 5A the substrate 108 and optical device 104 (not pictured) are positioned with respect to a hotplate 500. The hotplate 500 is positioned in a mold 502 having a first member 504 and a second member 506. A flexible member 508, such as a rubber membrane, is positioned with respect to or is an integral part of the second member 506. The light transmitting sheet 308 is positioned with respect to the substrate 108.

Figure 5B:
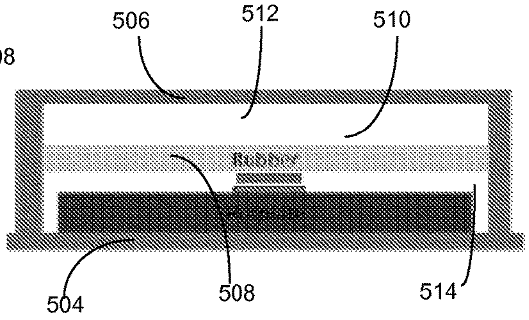

In FIG. 5B, the second member 506 is positioned with respect to the first member 504, such as by clamping the second member 506 in place. As positioned, the first member 504 and the second member 506 form a cavity 510. In various examples, the cavity 510 includes a first portion 512 and a second portion 514 separated and substantially isolated with respect to one another by the flexible member 508.

Figure 5C:
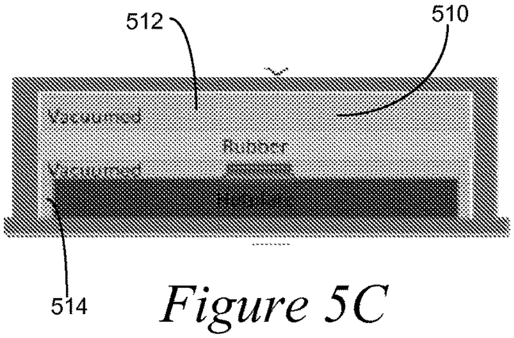

In FIG. 5C, the cavity 510 is brought to a sub-atmospheric pressure, such as by applying a vacuum to the cavity 510. In various examples, the sub-atmospheric pressure is less than approximately one (1) Torr. As illustrated, both the first portion 512 and the second portion 514 are evacuated.

Figure 5D:
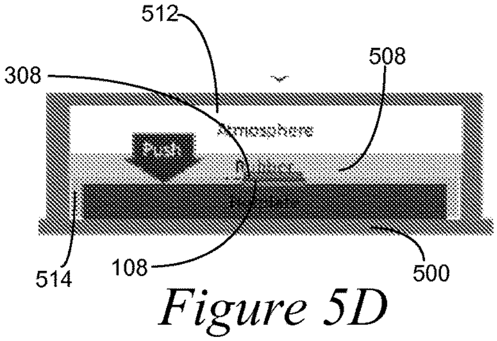

In FIG. 5D, the first portion 512 is brought to a higher pressure, such as atmospheric pressure by releasing the vacuum applied to the first portion 512, while the second portion 514 is maintained at a sub-atmospheric pressure. The resultant pressure differential may draw the flexible member 508 into contact with and apply pressure to the light transmitting sheet 308. In addition, the hotplate 500 may apply heat sufficient to secure the light transmitting sheet 308 with respect to the substrate 108 and optical device 104 (not pictured), such as by causing the light transmitting sheet 308 to flow and cure, as disclosed herein.

Figure 5E:
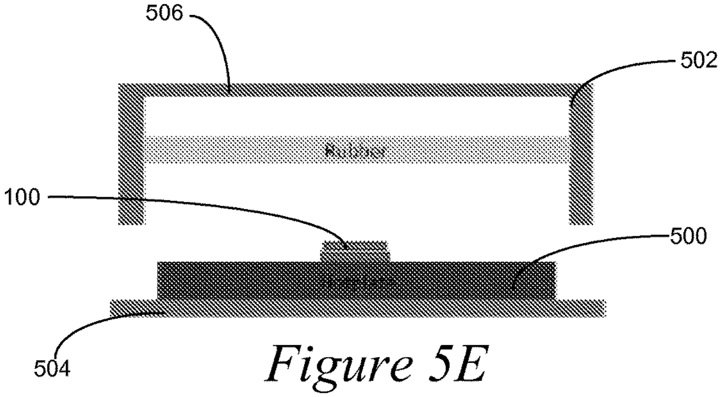

In FIG. 5E the second member 506 is released from the first member 504 and, optionally, the hotplate 500 turned off. The resultant optical assembly 100 may be removed from the mold 502.

Figure 6A:
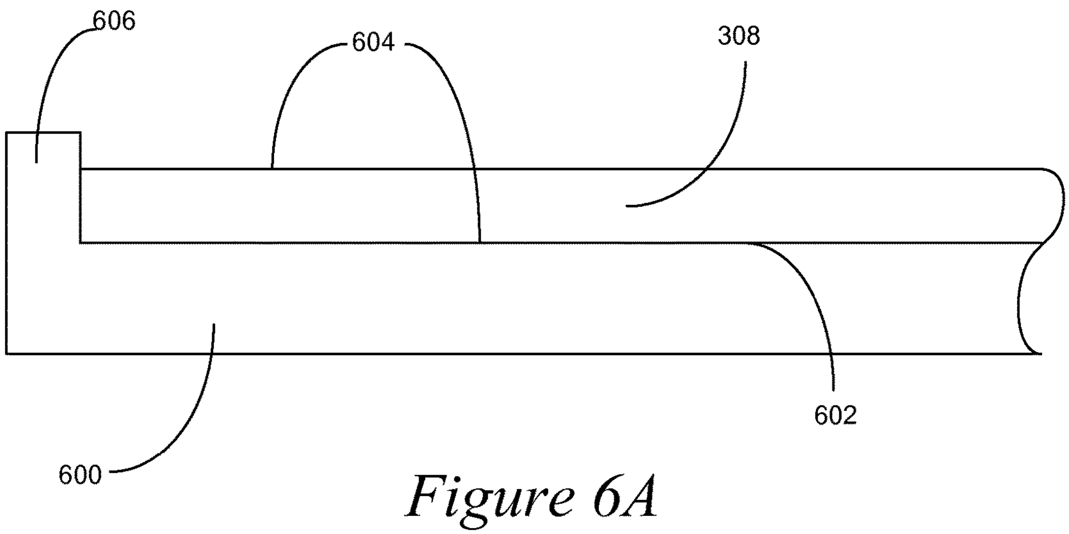
FIGS. 6A and 6B are profiles of a molding surface for making a light transmitting sheet.
Figure 6B:
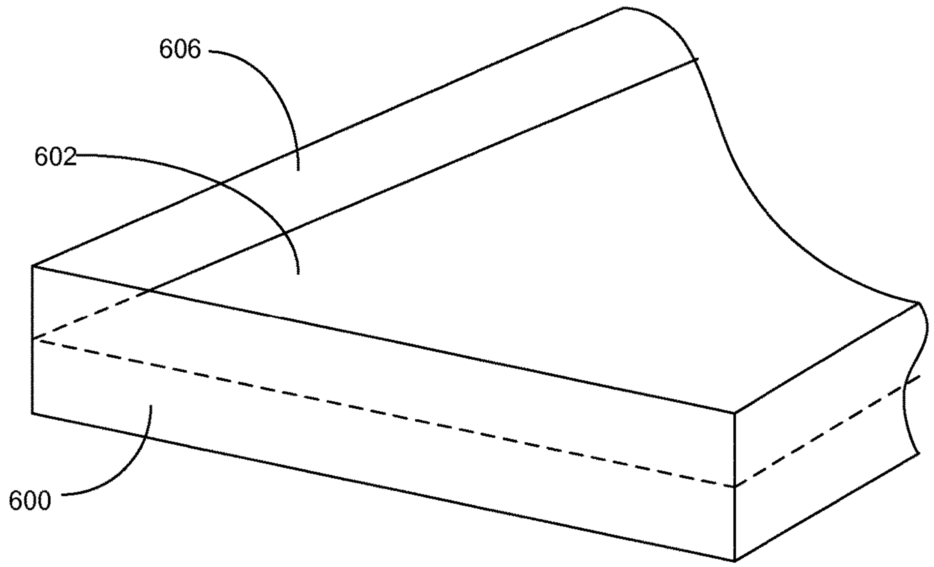

Light Transmitting Sheet:

FIGS. 6A and 6B illustrate a mold 600 for forming a light transmitting sheet 308 without respect to an optical assembly.

FIG. 6A shows a mid-section side profile of the mold 600. The light transmitting sheet 308, such as can be formed by the mold 600, is depicted as being contained within the mold 600. FIG. 6B shows a perspective profile of the mold 600, with the light transmitting sheet 308 not being depicted. The mold 600 of both FIGS. 6A and 6B includes a mold surface 602 that is configured to contact one of two major surfaces 604 of the light transmitting sheet 308. The mold 600 further includes a vertical member 606 configured to contain the light transmitting sheet 308, such as when the light transmitting sheet 308 has been heated to flow.

The mold 600 may incorporate a heat source or may be positioned within an oven or with respect to another heat source. The mold 600 may be shaped to effect multiple configurations for the light transmitting sheet 308. In various examples, the mold 600 may admit a previously formed light emitting sheet 308 or other form of the solid silicone composition having a first set of dimensions and then mold the solid silicone composition into a light emitting sheet 308 of second, different dimensions.

When the solid composition is in the form of, e.g., a pellet, spheroid, cube or a powder, it may be melt extruded and extruded into a sheet through, e.g., a T-die, and solidified by cooling to obtain a film or sheet. In other embodiments, a solid composition in the form of, e.g., a pellet, spheroid, cube or a powder may be applied directly to a surface, prior to heating the composition and causing it to flow to form, e.g., a sheet or a film. In some embodiments, a solid composition in the form of, e.g., a pellet, spheroid, cube or a powder may already comprise a phosphor when it is applied to a surface; a phosphor may be applied to a surface before the solid composition is applied to substantially the same surface; or a phosphor may be applied to a surface after the composition is applied to substantially the same surface.

The light transmitting sheet 308 itself has three dimensions, e.g., length, width, and thickness, but is not particularly limited in these dimensions. In various examples, the light transmitting sheet 308 has a thickness of from 10 micrometers to 1 mm or more. Alternatively, the light transmitting sheet 308 may have a thickness of from 10-500 micrometers, from 10 to 100 micrometers, from 20 to 90 micrometers, from 30 to 80 micrometers, from 40 to 70 micrometers, from 50 to 60 micrometers, or from 500 micrometers to 1 mm. The light transmitting sheet 308 may be formed as a continuous sheet that is cut or as a discrete unit.

The light transmitting sheet 308 may have any one or more of the same physical properties as described above relative to the solid composition or may have different physical properties. For example, the light transmitting sheet 308 may have greater than 50, 55, 60, 65, 70, 75, 80, 90, 95, 96, 97, 98, or 99, or about 100, percent light transmittance, as determined using ASTM E-903-96 or a modified version of ASTM D1003, described above. In various embodiments, the light transmitting sheet 308 is essentially (or substantially) free of visible air bubbles. As used herein, the terminology "essentially (or substantially) free of visible air bubbles" describes that the light transmitting sheet 308 does not have a plurality (e.g., two or more) of air bubbles visible to the naked eye. Alternatively, the light transmitting sheet 308 may be free of air bubbles visible under 5×, 10×, 20×, 50×, 100×, or 500× light magnification or even greater. The light transmitting sheet 308 may be further described as a lens, e.g., a lens for an optical assembly, as described above.

The light transmitting sheet 308 may be a monolayer, e.g., a single layer including, consisting essentially of, or consisting of, the solid silicone composition (cured, partially cured, or uncured) as described above. Typically, the terminology "consisting essentially of" describes that the light transmitting sheet 308 is free or substantially free of silicones, organic polymers, and the like, that are not described above. Alternatively, the light transmitting sheet 308 may be further defined as including two or more layers. In one embodiment, one of the two or more layers is formed from the composition described above. Other layers may include silicone layers, organic polymer layers, and the like. Alternatively, the light transmitting sheet 308 may include one or more layers of the composition described above. Each layer in this embodiment may be the same or different from one or more of each other yet all may still individually be a form/embodiment of the composition described above.

This disclosure also provides a composite article that includes the light transmitting sheet 308. The composite article may include the light transmitting sheet 308 and one or more additional sheets, e.g., one or more silicone sheets, organic sheets, etc. In one embodiment, the composite article includes a first outermost layer that may include the composition that has a refractive index of at least 1.4 and may include a phosphor. In this embodiment, the composite article may include a middle layer that may include the composition having a refractive index of at least 1.4. Moreover, the composite article may include the composition having a refractive index of from 1.4 to 1.65.

In another embodiment, the composite article includes first and second light transmitting sheets 308 each independently formed by the method of this disclosure. The composite article may also include a third light transmitting sheets 308 independently formed by the method of this disclosure. In other words, each of the first, second, and third light transmitting sheets 308 may be the same or different from one another and each is formed by one of the embodiments of the instant method. In one embodiment, the first light transmitting sheet 308 is a first outermost layer of the composite article and the second light transmitting sheet 308 is a second outermost layer of the composite article. In another embodiment, the first light transmitting sheet 308 is a first outermost layer of the composite article, the second light transmitting sheet 308 is a second outermost layer of the composite article, and the third light transmitting sheet 308 is a middle layer of the composite article sandwiched between the first and second outermost layers. In other embodiments, the first outermost layer has a refractive index of at least 1.1 or 1.2 and comprises a phosphor and the second outermost layer has a refractive index of at least 1.4. The middle layer may have a refractive index of at least 1.3. Alternatively, one or more of the layers may have a gradient of refractive indices, e.g., from 1.4 to 2.5, from 1.4 to 2.0, from 1.5 to 1.8, from 1.4 to 1.6, from 1.3 to 1.55, from 1 to 2.5, from 1.1 to 2.4, from 1.2 to 2.3, from 1.3 to 2.2, from 1.4 to 2.1, from 1.5 to 2.0, from 1.6 to 1.9, or from 1.7 to 1.8.

This disclosure also provides a curable silicone composition. The curable silicone composition is different from the solid composition described above that includes the organosiloxane block copolymer. Various suitable, but non-limiting, embodiments of the curable composition that can be utilized in this disclosure are described in U.S. Provisional Patent Application Ser. No. 61/581,852 and PCT Application No. PCT/US2012/071011, filed Dec. 30, 2012, both of which are hereby expressly incorporated herein by reference. The curable silicone composition may be formed using a method that includes the step of combining the solid composition and a solvent, as described above. The method may also include one or more steps of introducing and/or combining additional components, such as the organosiloxane resin and/or cure catalyst to one or both of the solid composition and the solvent. The solid composition and the solvent may be combined with each other and/or any other components using any method known in the art such as stirring, vortexing, mixing, etc.

The solid composition of this disclosure may be formed by a method that includes the step of reacting one or more resins, such as Phenyl-T resins, with one or more (silanol) terminated siloxanes, such as PhMe siloxanes. Alternatively, one or more resins may be reacted with one or more capped siloxane resins, such as silanol terminated siloxanes capped with MTA/ETA, MTO, ETS 900, and the like. In another embodiment, the solid composition is formed by reacting one or more components described above and/or one or more components described in U.S. Prov. Pat. App. Ser. No. 61/385,446, expressly incorporated herein by reference. In still another embodiment, the method may include one or more steps described in the aforementioned '446 patent application. In even further embodiments, the solid composition is, and/or is formed, as described in U.S. Provisional Patent Application Ser. No. 61/581,852 and PCT Application No. PCT/US2012/071011, filed Dec. 30, 2012, both of which are hereby expressly incorporated herein by reference.

The organosiloxane block copolymer may be formed using a method that includes the step of I) reacting a) a linear organosiloxane and b) an organosiloxane resin comprising at least 60 mole % of [$R^2SiO_{3/2}$] siloxy units in its formula, in c) a solvent. In various embodiments, the organosiloxane block copolymer is formed as described in U.S. Provisional Patent Application Ser. No. 61/581,852 and PCT Application No. PCT/US2012/071011, filed Dec. 30, 2012, both of which are hereby expressly incorporated herein by reference.

This disclosure also provides a method of forming the optical assembly 100, 200. The method includes the steps of applying the composition to the surface, heating the composition to the temperature at or above the glass transition temperature such that the silicone composition flows, cooling the silicone composition after the step of heating to form the light transmitting sheet 308 and disposing the light transmitting sheet 308 on the optical device 104, 204 to form the optical assembly 100, 200.

The step of combining is not particularly limited and may be include, or be further defined as, disposing the optical device 104, 204 and the light transmitting sheet 308 next to each other or on top of each other, and/or in direct or in indirect contact with each other. For example, the light transmitting sheet 308 may be disposed on and in direct contact with the optical device 104, 204. Alternatively, the light transmitting sheet 308 may be disposed on, but separated from and not in direct contact with, the optical device 104, 204 yet may still be disposed on the optical device 104, 204.

The disclosure also provides a method of forming a lens for a optical assembly. The method includes the steps of applying a release liner 308 to a mold 300, applying the composition to the release liner 308 in the mold 300, and compression molding the composition to form the lens, wherein the lens is substantially free of visible air bubbles.

In additional non-limiting embodiments, this disclosure includes one or more elements, components, method steps, test methods, etc. as described in one or more of U.S. Prov. Patent Appl. Ser. Nos. 61/385,446, filed Sep. 22, 2010; 61/537,146, filed Sep. 21, 2011; 61/537,151, filed Sep. 21, 2011; and 61/537,756, filed Sep. 22, 2011; and/or described in Published PCT Appl. Nos. WO2012/040302; WO2012/040305; WO2012/040367; WO2012/040453; and WO2012/040457, all of which are expressly incorporated herein by reference.

EXAMPLES

A series of inventive light transmitting sheets are formed according to this disclosure. A series of comparative light transmitting sheets are also formed but are not formed according to this disclosure. After formation, the inventive and comparative light transmitting sheets are evaluated to determine various physical properties.

Example 1

A 2 L 3-neck round bottom flask is loaded with 544 g toluene and 216 grams of a Phenyl-T Resin (FW=136.6 g/mole Si; 35.0 g, 0.256 moles Si). The flask is equipped with a thermometer, Teflon stir paddle, and a Dean Stark apparatus prefilled with toluene and attached to a water-cooled condenser. A nitrogen blanket is then applied. An oil bath is used to heat the flask at reflux for 30 minutes. Subsequently, the flask is cooled to about 108° C. (pot temperature).

A solution of toluene (176 g) and silanol terminated PhMe siloxane (140 dp, FW=136.3 g/mole Si, 1.24 mole % SiOH, 264 g) is then prepared and the siloxane is capped with 50/50 MTA/ETA (Avg. FW=231.2 g/mole Si, 4.84 g, 0.0209 moles Si) in a glove box (same day) under nitrogen by adding 50/50 MTA/ETA to the siloxane and mixing at room temperature for 2 hours. The capped siloxane is then added to the Phenyl-T Resin/toluene solution at 108° C. and refluxed for about 2 hours.

After reflux, the solution is cooled back to about 108° C. and an additional amount of 50/50 MTA/ETA (Avg. FW=231.2 g/mole Si, 38.32 g, 0.166 moles Si) is added and the solution is then refluxed for an additional 2 hours.

The solution is then cooled to 90° C. and 33.63 g of DI water is added. The solution is then heated at reflux for one hour and water is removed via azeotropic distillation. The solution is then heated for an additional 3 hours and then cooled to 100° C. Subsequently, 4.8 grams of Darco G60 carbon black is added and the solution is cooled to room temperature with stirring and stirred overnight at room temperature. And then pressure filtered through a 5.0 μm filter to isolate the solid composition.

The solid composition, 50.01 g, is then dissolved in toluene to form a 58.2% solids solution. 0.15 grams of a 1 weight percent DBU catalyst/toluene solution is then added and the solution is distilled at 30° C. and 13 Torr for 2 hours to obtain 36.05 g (80.7% solid solution). Subsequently, this solution is cast at about 1 mm thickness on PET film, followed by drying under nitrogen over for 4 days. Excess solvent is then further removed under vacuum at 50° C. for 2 hours in a vacuum oven.

To evaluate the molding of this composition, a release film is set on a lower mold of a compression molding machine (FFT1005, produced by TOWA Corporation). The lower mold has small dome shape (radius: 1.1 mm) and large dome shape (radius: 1.5 mm). In addition an FR-4 glass-epoxy substrate is set onto the upper mold of the compression molding machine. 1.5 g of the immediately aforementioned composition is then placed onto the release film. A 6 second degas-vacuum process is then initiated and the lower mold is then fully clamped and pressed in an upwards direction towards the upper mold. The composition is then heated (and cured) in the mold for 5 minutes at 130° C. at 39 kN to form an inventive light transmitting sheet. The mold is then opened and the inventive light transmitting sheet disposed on the FR-4 substrate is ejected from the molding machine. Due to the mold, the inventive light transmitting sheet has both small and large dome shapes.

Figure 7:
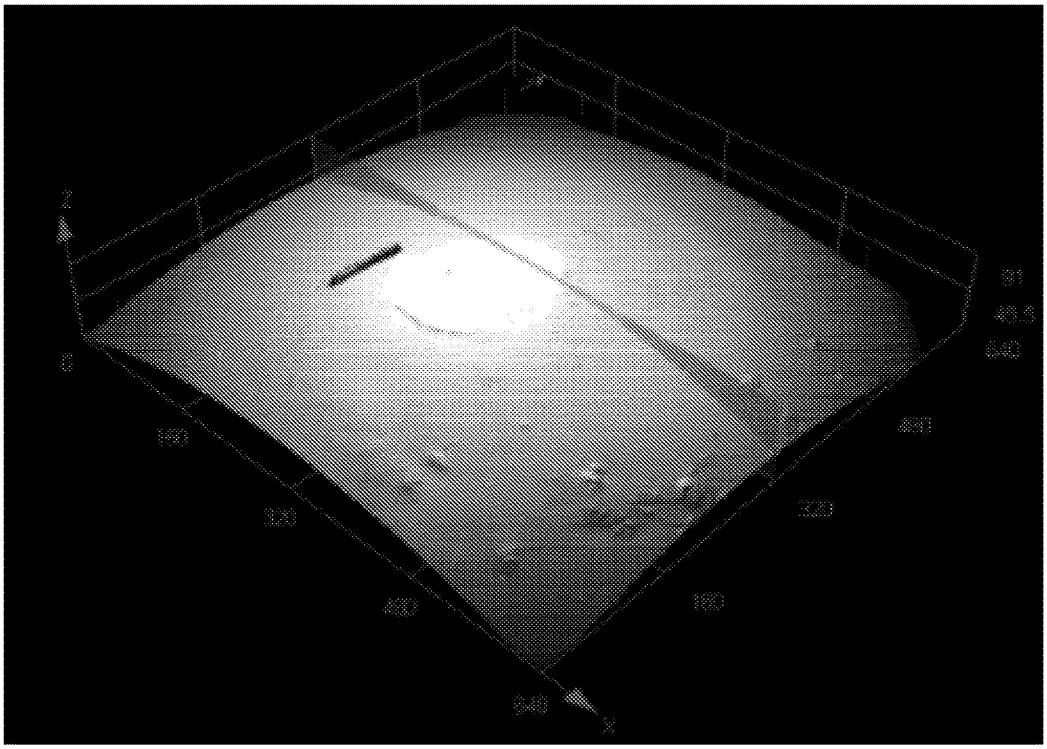
FIG. 7 is a 3-dimensional microscopic image of a small dome of a silicone composition.
Figure 8:
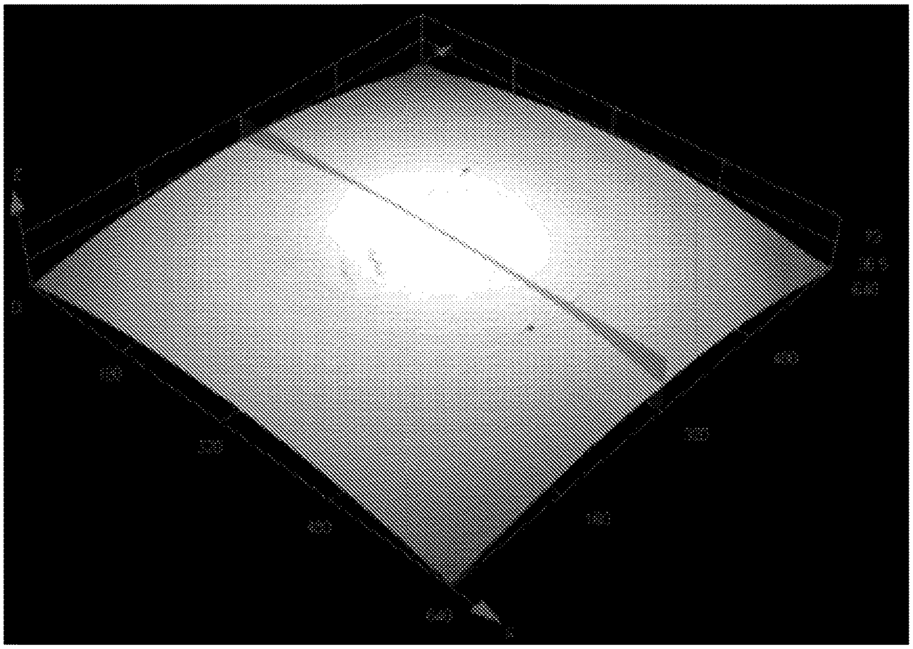
FIG. 8 is a 3-dimensional microscopic image of a large dome of a silicone composition.

The appearance of the small and large domes is then evaluated by microscope. Delamination of the domes and overflow from the FR-4 substrate is evaluated by visual inspection. Dome delamination defect, void defect and overflow defect are not observed. The small and large domes are obtained as set forth in FIGS. 7 and 8. As shown in these Figures, both the small and large domes are formed free of air bubbles.

Comparative Example 1

A liquid composition is then prepared that includes the following components:

4.93 g of siloxane that has an average unit molecular formula:

$(Me_2ViSiO_{1/2})0.25(PhSiO_{3/2})0.75$.

0.65 g of a siloxane that has an average unit molecular formula:

$(Me_2SiO_{1/2})0.10(MeViSiO_{1/2})0.15(PhSiO_{3/2})0.75$ 2.5 g of a siloxane that has an average unit molecular formula:

$Me_2ViSiO(MePhSiO)25OSiMe_2Vi$ 1.49 g of a siloxane that has an average unit molecular formula:

$H\ Me_2SiO(Ph2SiO)SiMe_2H$ 0.16 g of a siloxane that has an average unit molecular formula:

$(H\ Me_2SiO_{1/2})0.60(PhSiO_{3/2})0.40$ 0.25 g of a siloxane that has an average unit molecular formula:

$(Me_2ViSiO_{1/2})0.18(PhSiO_{3/2})0.54(EpMeSiO_{1/2})0.28$, wherein EP=glycidoxypropyl 0.2 g of a siloxane that has an average unit molecular formula:

Cyclic $(ViSiMeO_{1/2})n$ 200 ppm of 1-ethynyl-1-cyclohexanol.

2 ppm of a Pt(1.3-divinyltetramethylsiloxane) complex.

The above components are combined using a vacuum planetary mixer (Thinky ARV-310) for 2 minutes at 1600 rpm under 2 kPa. 1.5 g of the combination is then dispensed onto the FR-4 release film in the aforementioned lower mold. A 6 second degas-vacuum process is then initiated and the lower mold is fully clamped up and pressed in an upwards direction. The composition is then heated and cured as described above to form a comparative light transmitting sheet having large and small dome shapes. Upon microscopic and visual evaluation, both the large and small domes exhibit dome delamination defects and void defects.

The results of the aforementioned evaluations are summarized in Table 1 below:

TABLE 1

| | Results | | |
|---|---|---|---|
| | Dome Delamination | Void | Overflow |
| Example 1 | No | No | No |
| Example 2 | No | No | No |
| Comparative Example 1 | Yes | Yes | Yes |

Figure 9A:
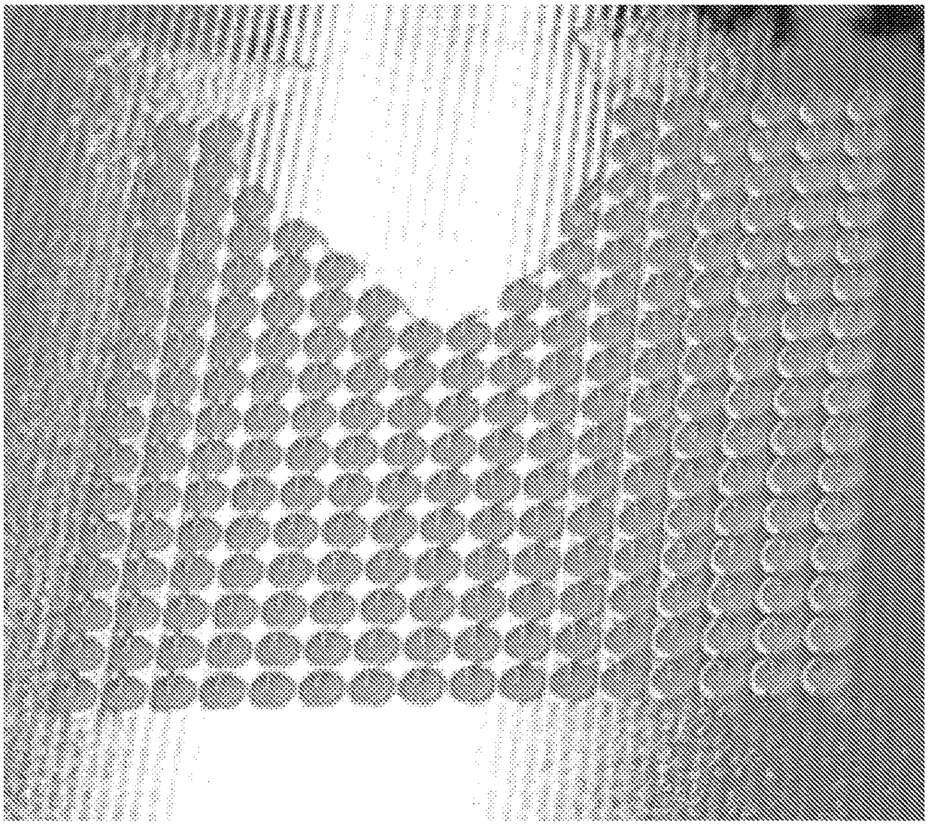
FIG. 9A is an image of dome delamination.
Figure 9B:
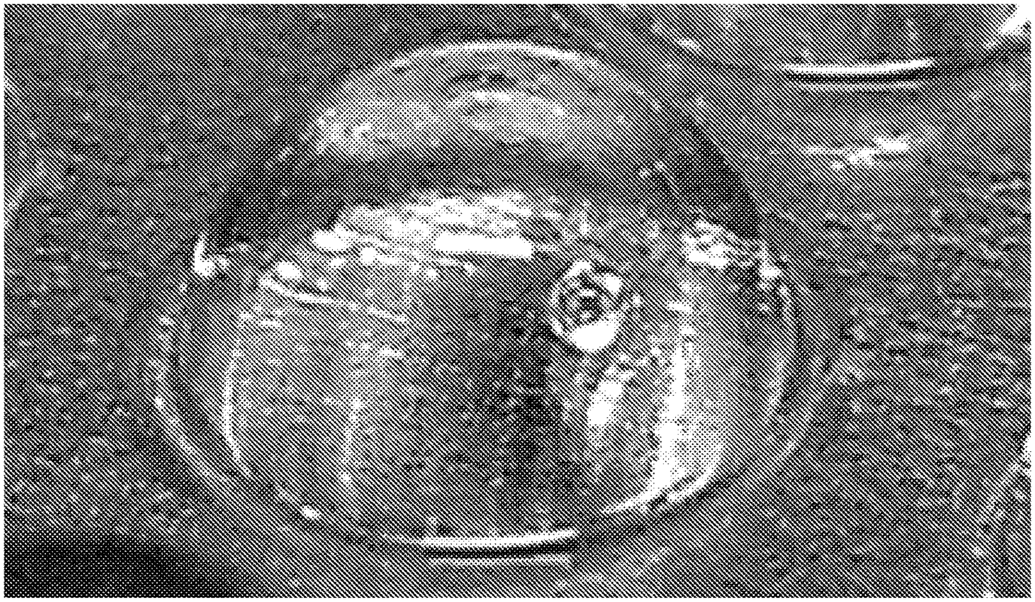
FIG. 9B is an image of a void.
Figure 9C:
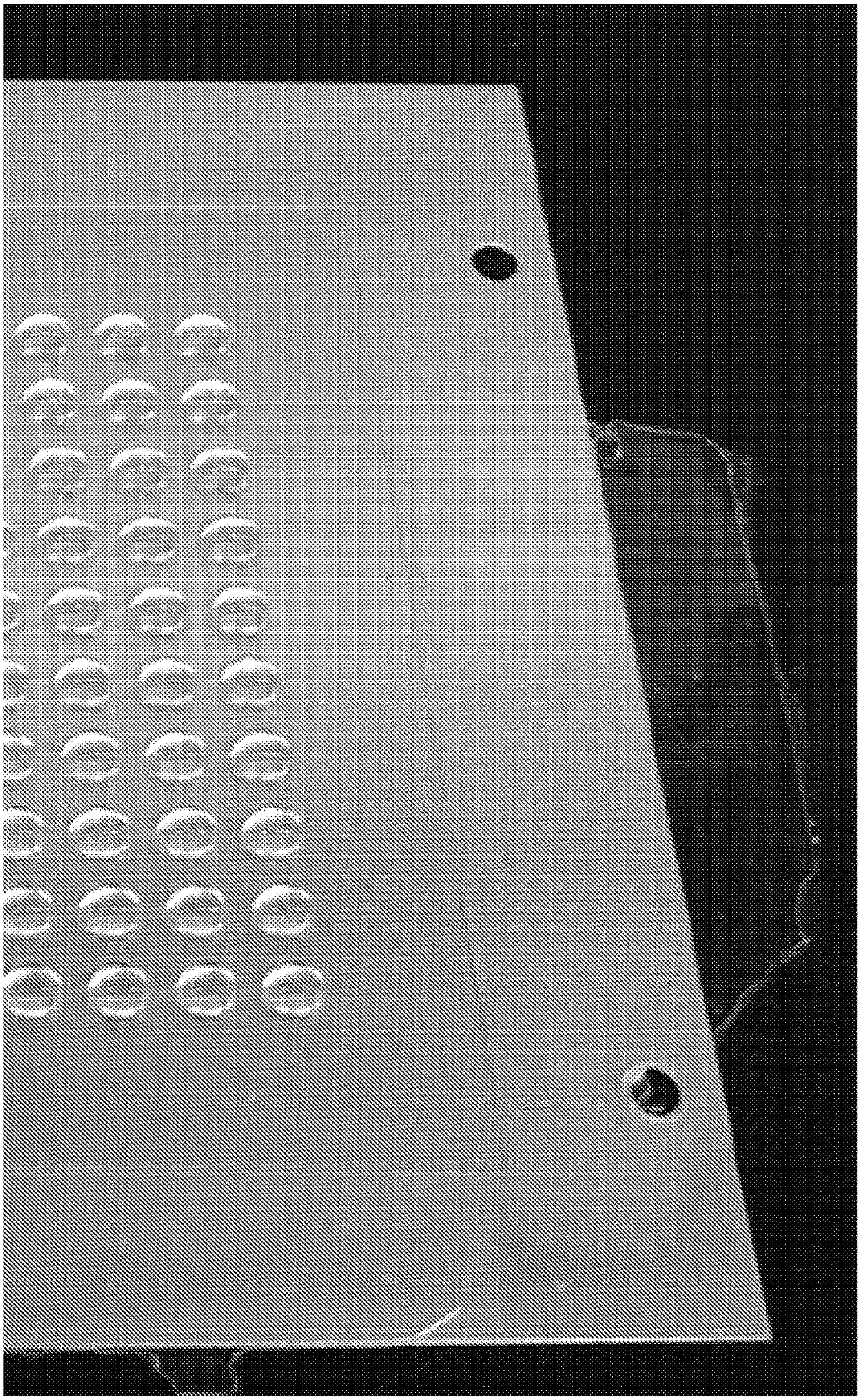
FIG. 9C is an image of an overflow.

Visual examples of Dome Delamination, Voids, and Overflow of Comparative Example 1 are set forth in FIGS. 9A, 9B, and 9C, respectively.

Example 2

To form Example 2, 40.04 g of the solid composition of Example 1 is dissolved in toluene to form a 58.1% solids solution. 0.22 grams of a 1 weight percent DBU catalyst/toluene solution and 1.40 grams of NTAG4851, a phosphor particle purchased from Intematix, are then added to form a mixture. The mixture is then distilled at 10 torr to obtain 54.87 g total solution. The solution is then casted into a sheet using a 1 mm gap on a 50 μm-thick fluoro-coated PET film, then dried at room temperature for two days. Subsequently, the sheet is heated at 35° C. under an $N_2$ flow for 5 days and then placed in a 50° C. vacuum oven for 2 hours to form an additional embodiment of an inventive light transmitting sheet having a thickness of approximately 550 μm.

1.5 g of the immediately aforementioned composition is then placed onto the release film. A 6 second degas-vacuum process is then initiated and the lower mold is then fully clamped and pressed in an upwards direction towards the upper mold. The composition is then heated (and cured) in the mold for 5 minutes at 120° C. at 39 kN to form an inventive light transmitting sheet. The mold is then opened and the inventive light transmitting sheet disposed on the FR-4 substrate is ejected from the molding machine. Due to the mold, the inventive light transmitting sheet has both small and large dome shapes.

The appearance of the small and large domes is then evaluated by microscope. Delamination of the domes and overflow from the FR-4 substrate is evaluated by visual inspection. Dome delamination defect, void defect and overflow defect are not observed.

Transfer Molding

Additional samples of Example 2 and Example 1, with phosphor and without phosphor, respectively, are then molded by transfer molding. More specifically, toluene solutions of both samples of Example 2 and Example 1 are casted into a sheet using a 1 mm gap on a 50 μm-thick fluoro-coated PET sheets, then dried at room temperature for two days. Subsequently, the sheets are heated at 35° C. under an $N_2$ flow for 5 days and then placed in a 50° C. vacuum oven for 2 hours to form sheets having a thickness of approximately 550 μm.

More specifically, 1.5 grams of Example 2 is set in transfer pot of the transfer molding equipment (produced by APIC Yamada Corporation) applied by transfer molding to an aluminum substrate and cured at 120° C. for 5 minutes. After curing, the appearance of the cured sample is then evaluated by visual inspection and microscopic inspection to determine the presence of voids and/or burrs and to determine whether any delamination occurs. Example 1 without phosphor is tested in the same procedure as described above at 130° C. The results of these visual evaluations are set forth immediately below.

| | Cure time (minutes) | Temperature (° C.) | Void | Burr | Delamination |
|---|---|---|---|---|---|
| Example 2: w/phosphor | 5 | 120 | No | No | No |
| Example 1: w/o phosphor | 5 | 130 | No | No | No |

The data set forth above and illustrated in the Figures shows that the Examples that are representative of various non-limiting embodiments of this disclosure produce excellent results that are superior to the results achieved by comparative Examples. The examples of this disclosure exhibit superior physical properties with minimized, or eliminated, voids, burrs, delamination, etc. Moreover, the methods of this disclosure tends to be more efficient, less time consuming, less expensive, easier, and less complex than comparative methods or examples. Typically, the light transmitting sheet of this disclosure also minimizes yellowing, has low absorptions losses, high toughness, excellent thermal stability, flexibility in processing (e.g., in B-staged films), and/or exhibits adhesion to a variety of surfaces without the need, or with minimal need, for adhesion promoters. Moreover, the light transmitting sheet of this disclosure tends to be formed with accurate and precise reproducibility in a reliable and efficient manner.

One or more of the values described above may vary by ±5%, ±10%, ±15%, ±20%, ±25%, etc. so long as the variance remains within the scope of the disclosure. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

Figure 10:
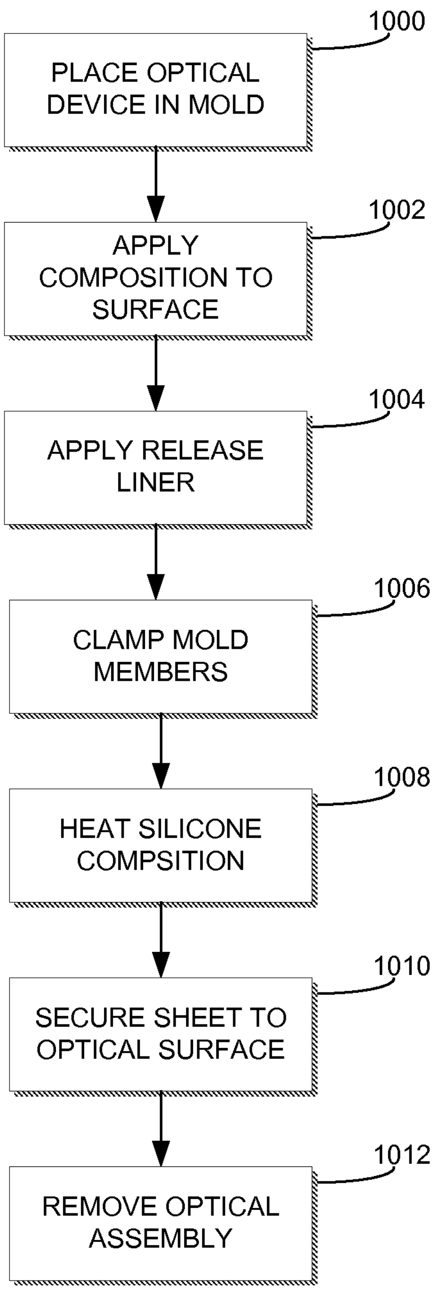
FIG. 10 is a flowchart for making an optical article.

FIG. 10 is a flowchart for making an optical article. In an example, the flowchart of FIG. 10 may be utilized to make an optical article, such as a light transmitting sheet from the silicone composition, or an optical assembly 100, 200 (for the purposes of this example, the optical assembly 100 will be referenced, though any other optical assembly may also be utilized or formed) including the silicone composition. In various examples, the light transmitting sheet is first formed and then incorporated into an optical assembly 100. In various examples, the silicone composition is in a variety of starting states (e.g., pellet, spheroid, ribbon, sheet, cube, powder, film, flake or sheet), though the flowchart be utilized to produce any of a variety of optical assemblies disclosed herein or known in the art. The flowchart may generally incorporate various structures and methodologies disclosed herein, or any suitable structure or methodology known in the art.

At 1000, an optical device 104 is optionally placed in a mold 300 502.

At 1002, a silicone composition is applied to a surface 106, 206, 602. In various examples, the silicone composition is a solid and has a glass transition temperature greater than room temperature.

In various examples, the surface is an optical surface 106, 206 of an optical device 104, 204. In various examples, the silicone composition is a pellet, spheroid, ribbon, sheet, cube, powder, film, flake or sheet. In an example, the silicone composition is a sheet 308, the sheet has a major surface 604, and the major surface 604 of the sheet 308 is placed against the optical surface 106, 206 of the optical device 104, 204. In an example, the silicone composition is positioned between the surface 106, 206 and a release liner 310.

In various alternative examples, the surface is a surface 602 of the mold 600. In such examples, the solid silicone composition may be formed into a light transmitting sheet 308. As above, the silicone composition may be a pellet, spheroid, ribbon, sheet, cube, powder, film, flake or sheet.

At 1004, such as where the silicone composition a sheet 308, a release liner 310 is optionally applied to a first major surface 604 of the sheet.

At 1006, the first member 302, 504 of the mold 300, 502 is clamped against the second member 304, 506 of the mold 300, 502, so that the first and second members of the mold 300, 502 form a cavity 306, 510. In an example, placing the optical device 104, 204 and the silicone composition (e.g., the light transmitting sheet 308) in the mold 300, 502 includes positioning the optical device 104, 204 and the silicone composition such that the optical device 104, 204 and at least a portion of the silicone composition are contained within the cavity 306, 510 upon clamping the first and second members of the mold 300, 502. In an example, the release liner 310 is proximate the first member 302, 504 of the mold 300, 500 and the optical device 104, 204 is proximate the second member 304, 506 of the mold 300, 502.

At 1008, the silicone composition is heated to a temperature at or above the glass transition temperature such that the silicone composition flows. In various examples, the silicone composition forms a light transmitting sheet 308 upon cooling following the heating. In various examples, the silicone composition is heated via at least one of compression molding with respect to the optical surface 104, 204, injection transfer molding with respect to the optical surface 104, 204, and laminating with respect to the optical surface 104, 204.

In various examples, the sheet 308 is proximate the first member 302, 504 of the mold 300, 502 and the optical device 104, 204 is proximate the second member 304, 506 of the mold 300, 502, and the first member 302, 504 of the mold 300, 502 is configured to form the sheet 308 into a predetermined configuration upon heating the sheet 308. In an example, the predetermined configuration is a lens 102.

At 1010, the silicone composition in sheet form is optionally secured with respect to an optical surface 106, 206 of the optical device 104, 204 to form the optical assembly 100. In various examples, silicone composition is secured as a result of heating the silicone composition, such as at 1008.

At 1012, a resultant, exemplary optical assembly 100 is removed from the mold 300, 502.

It is noted that where the optical article to be formed is not the optical assembly, steps such as are related to the formation of an optical assembly 100 are not necessarily performed.

What is claimed is:

1. A method of forming an optical article, comprising:

applying a silicone composition to a surface, wherein the silicone composition is a solid and has a glass transition temperature greater than room temperature; and heating the silicone composition to a temperature at or above the glass transition temperature such that the silicone composition flows;

wherein:

the silicone composition forms a light transmitting sheet upon cooling following the heating; and the silicone composition comprises an organosiloxane block copolymer having a weight average molecular weight of at least 20,000 g/mole and comprises:

40 to 90 mole percent disiloxy units of the formula $[R^1{}_2SiO_{2/2}]$ arranged in linear blocks each having an average of from 10 to 400 disiloxy units $[R^1{}_2SiO_{2/2}]$ per linear block;

10 to 60 mole percent trisiloxy units of the formula $[R^1{}_2SiO_{3/2}]$ arranged in non-linear blocks each having a weight average molecular weight of at least 500 g/mole; and 0.5 to 25 mole percent silanol groups [≡SiOH];

wherein $R^1$ is independently a $C_1$ to $C_{30}$ hydrocarbyl and $R^2$ is independently a $C_1$ to $C_{20}$ hydrocarbyl, wherein at least 30 weight percent of the non-linear blocks are crosslinked with another non-linear block and aggregated in nano-domains, and wherein each linear block is linked to at least one non-linear block.

2. The method of claim 1, wherein the surface is an optical surface of an optical device.

3. The method of claim 2, wherein the silicone composition is a pellet, spheroid, ribbon, sheet, cube, powder, film, flake or sheet.

4. The method of claim 3, wherein the silicone composition is a sheet, wherein the sheet has a major surface, and wherein placing the sheet against the optical surface comprises placing the major surface of the sheet against the optical surface.

5. The method of claim 1 wherein the light transmitting sheet is substantially free of visible air bubbles.

6. The method of claim 1 wherein the light transmitting sheet has a light transmittance of at least 95% as determined using ASTM D1003.

7. The method of claim 1 further comprising curing the silicone composition via a condensation reaction.

8. The method of claim 7 wherein the curing occurs at a temperature higher than the glass transition temperature of the silicone composition.

9. The method of claim 1, wherein the disiloxy units have the formula $$[(CH_3)(C_6H_5)SiO_{2/2}].$$

10. The method of claim 1, wherein the organosiloxane block copolymer comprises at least 30 weight percent disiloxy units.

11. The method of claim 1, wherein $R^2$ is phenyl.

12. The method of claim 1 wherein the silicone composition has a tensile strength greater than to MPa and an % elongation at break greater than 20% as determined using ASTM D412.

13. The method of claim 1 wherein the glass transition temperature of the silicone composition is from 25° C. to 200° C.

14. The method of claim 1 wherein the light transmitting sheet has a thickness from 10 micrometers to 1 mm.

15. The method of claim 1 wherein the light transmitting sheet is a monolayer.

16. A composite article comprising first and second light transmitting sheets each independently formed by the method of claim 1 wherein the first light transmitting sheet is a first outermost layer of the composite article and the second light transmitting sheet is a second outermost layer of the composite article.

* * * * *